United States Patent
Yoshizaki et al.

(10) Patent No.: US 8,766,521 B2
(45) Date of Patent: Jul. 1, 2014

(54) SPARK PLUG

(75) Inventors: Hirotoshi Yoshizaki, Nagoya (JP);
Naomichi Miyashita, Kasugai (JP);
Mamoru Musasa, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 13/813,774

(22) PCT Filed: Jul. 29, 2011

(86) PCT No.: PCT/JP2011/067453
§ 371 (c)(1),
(2), (4) Date: Feb. 1, 2013

(87) PCT Pub. No.: WO2012/017944
PCT Pub. Date: Feb. 9, 2012

(65) Prior Publication Data
US 2013/0169141 A1    Jul. 4, 2013

(30) Foreign Application Priority Data

Aug. 3, 2010  (JP) ................................. 2010-174280
Aug. 3, 2010  (JP) ................................. 2010-174281
Aug. 3, 2010  (JP) ................................. 2010-174284

(51) Int. Cl.
*H01T 13/08*  (2006.01)
(52) U.S. Cl.
USPC ................................. 313/141; 123/169 EL
(58) Field of Classification Search
None
See application file for complete search history.

(56) References Cited

U.S. PATENT DOCUMENTS

| | | | |
|---|---|---|---|
| 3,529,837 A | 12/1968 | Eaton et al. | 277/592 |
| 6,489,709 B1 | 12/2002 | Teramura et al. | 313/140 |
| 7,176,608 B2 * | 2/2007 | Kanao | 313/141 |
| 7,477,006 B2 | 1/2009 | Fukuzawa et al. | 313/118 |
| 7,914,353 B2 | 3/2011 | Kobayashi et al. | 445/7 |
| 2004/0066124 A1 | 4/2004 | Kanao et al. | 313/135 |

(Continued)

FOREIGN PATENT DOCUMENTS

| | | | | |
|---|---|---|---|---|
| JP | 48-25695 | 7/1973 | | F16J 53/41 |
| JP | 50-71635 | 6/1975 | | H01T 13/00 |

(Continued)

OTHER PUBLICATIONS

Notification of Reasons for Refusal (dated Apr. 17, 2012) issued in connection with corresponding Japanese Patent Application No. JP 2010-174284, with English translation.

(Continued)

*Primary Examiner* — Ashok Patel
(74) *Attorney, Agent, or Firm* — Kusner & Jaffe

(57) ABSTRACT

In process of threadably fitting a metal shell having a surface formed with an Ni plated layer into a mounting hole, in a state where a gasket made of stainless steel is uncompressed while being interposed between a protrusion part and an opening periphery, a surface of the gasket is out of contact with another surface thereof. When the gasket is viewed on a cross section in a direction of an axial line O, the gasket contacts with the protrusion part at one point of a point X, the gasket contacts with the opening periphery flat one point of a point Y, and the point Y is located outside of the point X in a radial direction. Further, the point Y is located inside of a maximum outer diameter Dz of a seating surface of the protrusion part in the radial direction.

18 Claims, 10 Drawing Sheets

(56) References Cited

U.S. PATENT DOCUMENTS

| | | | |
|---|---|---|---|
| 2008/0098974 A1 | 5/2008 | Fukuzawa et al. | 123/169 |
| 2008/0203882 A1 | 8/2008 | Kobayashi et al. | 313/141 |
| 2009/0085304 A1 | 4/2009 | Miyashita et al. | 277/591 |
| 2009/0102346 A1 | 4/2009 | Fukuzawa et al. | 313/135 |
| 2009/0127997 A1* | 5/2009 | Kameda et al. | 313/141 |
| 2010/0206256 A1* | 8/2010 | Kishimoto et al. | 123/169 E |
| 2011/0148275 A1* | 6/2011 | Taido et al. | 313/141 |
| 2011/0215704 A1* | 9/2011 | Kameda et al. | 313/141 |

FOREIGN PATENT DOCUMENTS

| | | | | |
|---|---|---|---|---|
| JP | 55-117660 | 8/1980 | | F16J 15/08 |
| JP | 63-117091 | 7/1988 | | H01T 13/40 |
| JP | 2-5648 | 1/1990 | | F16J 15/08 |
| JP | 2000-266186 | 9/2000 | | F16J 15/08 |
| JP | 2001-187966 | 7/2001 | | F16J 15/06 |
| JP | 2003-278630 | 10/2003 | | F02P 13/00 |
| JP | 2004-134120 | 4/2004 | | H01T 13/08 |
| JP | 2008-135370 | 6/2008 | | H01T 13/06 |
| JP | 2008-210681 | 9/2008 | | H01T 21/02 |
| JP | 2009-93927 | 4/2009 | | H01T 13/08 |
| JP | 2009-97710 | 5/2009 | | F16J 15/06 |

OTHER PUBLICATIONS

Notification of Reasons for Refusal (dated Jun. 19, 2012) issued in connection with corresponding Japanese Patent Application No. JP 2010-174281, with English translation.

International Search Report for International Application No. PCT/JP2011/067453, Oct. 11, 2011.

* cited by examiner

FIG. 15

TABLE 15

| Sample | | Return torque [N · m] | Material | Equivalent friction diameters [mm] |
|---|---|---|---|---|
| 141 | (diagram) | 7.9 | SUS | 13.5 |
| 142 | (diagram) | 4.7 | Fe | - |
| 143 | (diagram) | 6.7 | SUS | 14.8 |
| 144 | (diagram) | 4.4 | SUS | - |

TABLE 1

| Cross-sectional shapes of gaskets (right hand side is inner peripheral side) |||||||
|---|---|---|---|---|---|
| TYPE A1 | TYPE A2 | TYPE B1 | TYPE B2 | TYPE C1 | TYPE C2 |
|  |  |  |  |  |  | ized, and the performance is enhanced with a tendency to intensify the vibrations of the engine. Further, there is a tendency to raise a temperature within the combustion chamber. In the gasket, when the axial force is reduced by deformation caused by the vibration of the engine, or creep deformation occurring due to heating and cooling cycles associated with drive and stop to slacken the screwing, the adhesion may be deteriorated. Under the circumstances, there has been known a spark plug that ensures deformation at the time of mounting, and maintains the adhesion by defining a shape (folding back) of the gasket while enhancing a material strength of the gasket and suppressing a plastic deformation after fastening to ensure the axial force (for example, refer to Japanese Patent Unexamined Publication Application No. 2004-134120 "Patent Literature 1"),

SPARK PLUG

FIELD OF THE INVENTION

The present invention relates to a spark plug having a seal member that seals in airtight leakage from a mounting hole in an internal combustion engine.

BACKGROUND OF THE INVENTION

In general, the spark plug is fitted to the internal combustion engine by screwing a screw thread formed on an outer periphery of a metal shell with a female screw formed in the mounting hole of the internal combustion engine. An annular seal member (gasket) is mounted on an outer periphery of the metal shell to prevent airtight leakage within a combustion chamber through the mounting hole. A general gasket is prepared by folding a metal plate, which is annularly formed, in a thickness direction, for example, so that a cross section (cross section orthogonal to a circumferential direction after formation) is S-shaped. When the spark plug is attached, the gasket is interposed and compressed between a protrusion part of the metal shell and an opening periphery of the mounting hole. The gasket is deformed with screwing, and an adhesion with and an axial force (reactive force exerted in an axial direction due to compression caused by fastening) on each of the protrusion part and the opening periphery are enhanced to seal in the airtight leakage.

In recent years, the internal combustion engines are downsized, and the performance is enhanced with a tendency to intensify the vibrations of the engine. Further, there is a tendency to raise a temperature within the combustion chamber. In the gasket, when the axial force is reduced by deformation caused by the vibration of the engine, or creep deformation occurring due to heating and cooling cycles associated with drive and stop to slacken the screwing, the adhesion may be deteriorated. Under the circumstances, there has been known a spark plug that ensures deformation at the time of mounting, and maintains the adhesion by defining a shape (folding back) of the gasket while enhancing a material strength of the gasket and suppressing a plastic deformation after fastening to ensure the axial force (for example, refer to Japanese Patent Unexamined Publication Application No. 2004-134120 "Patent Literature 1"), In a direct-injection engine, a positional relationship among a ground electrode protruded toward an interior of the combustion chamber, a fuel injection port, and a spark discharge gap influences ignitability. Hence, it is desirable that a direction (the above positional relationship within the combustion engine) of the ground electrode can be freely adjusted due to rotation of a screw when the spark plug is fitted to the engine. Under the circumstances, there has been known that thread fastening when the spark plug is attached ensures a magnitude (variation in compression displacement) that enables the gasket to be crushed while maintaining the torque (for example, refer to Japanese Patent Unexamined Publication Application No. 2000-266186 "Patent Literature 2"). In Patent Literature 2, the variation in the compression displacement of the gasket is ensured by 0.5 mm or more, as a result of which the rotation of the screw in a state where a given axial force is maintained is ensured by 0.5 to 1 rotation or more so that the direction of the ground electrode can be adjusted.

SUMMARY OF INVENTION

However, in Patent Literature 1, the vibration of the engine is increased in association with higher performance of the engine, and a resultant large force is exerted on the spark plug, and slippage may occur between the gasket and the protrusion part or between the gasket and the opening periphery, resulting in screw loose.

In Patent Literature 2, a portion of a crush margin for ensuring the variation in the compression displacement of the gasket is ensured to be larger in a radial direction than in an axial direction of the gasket. The gasket is liable to widen in the radial direction by being crushed during mounting, and therefore the gasket which is larger radially in a shape of the portion of the crush margin may protrude from the protrusion part.

The present invention has been made to solve the above problem, and an object of the present invention is to provide a spark plug that can ensure a loose resistance of a metal shell that is screwed into a fitting hole through a seal member, and can ensure a crush margin of a sufficient size while suppressing the protrusion of the seal member from the protrusion part when the seal member is crushed.

A first aspect of the invention provides a spark plug, comprising:

a center electrode;

an insulator that has an axial hole and holds the center electrode within a front end side of the axial hole;

a cylindrical metal shell that surrounds and holds the insulator in a circumferential direction, has a screw thread formed in an outer periphery thereof, and has a protrusion part formed closer to a base end side than the screw thread, the protrusion part protruding outward from the outer periphery thereof, and surrounding the outer periphery in a circumferential direction;

a ground electrode that forms a spark discharge gap between the ground electrode and the center electrode; and a seal member that has an annular configuration formed by folding an annular plate in a thickness direction by a plurality of times, and concentrically mounted on a region of the metal shell between the screw thread and the protrusion part from outside, in which in a state where the metal shell is threadably fitted into an internally threaded mounting hole, the seal member is compressed between the protrusion part and an opening periphery of the mounting hole, and seals a space between the protrusion part and the opening periphery, wherein in process of threadably fitting the metal shell into the mounting hole, in a state where the seal member is uncompressed while being interposed between the protrusion part and the opening periphery, surfaces of the seal member which face each other by folding are out of contact with each other, and the seal member contacts with the protrusion part at one point of a first contact point, the seal member contacts with the opening periphery at one point of a second contact point, and the second contact point is located outside of the first contact point in a radial direction when a cross section of the seal member is viewed on a plane including an axial line of the spark plug.

When the spark plug is fitted into the mounting hole of the internal combustion engine, the seal member is compressed between the protrusion part of the metal shell and the opening periphery of the mounting hole, and comes in surface contact with the protrusion part and with the opening periphery to maintain the airtight leakage through the mounting hole. If frictional forces between the seal member and each of the protrusion part and the opening periphery are increased, the loose resistance of the metal shell can be ensured. In this example, it has been verified by the present inventors that if the spark plug is removed, slippage between the seal member and the opening periphery is liable to occur more than slippage between the seal member and the protrusion part. The seal member formed by folding back a plate material has a spring property, and deformation caused by compression is conducted mainly on the fold back portion. For that reason, if a contact between the uncompressed seal member and the protrusion part is conducted at one point of a first contact point, and a contact between the seal member and the opening periphery is conducted at one point of a second contact point, even if the seal member is compressed, a positional relationship between the first contact point and the second contact point in the radial direction is maintained. Moreover, if the second contact point is located outside of the first contact point in the radial direction, a diameter of a virtual circle drawn by the second contact point that contacts with the opening periphery can be made larger than a diameter of a virtual circle drawn by the first contact point that contacts with the protrusion part. As a result, a frictional force between the seal member and the opening periphery can be made larger than a frictional force between the seal member and the protrusion part. For that reason, the slippage can be smoothed between the seal member and the protrusion part so as to suppress the slippage between the seal member and the opening periphery. Hence, the axial force when fastening is conducted by the same fastening torque can be increased, and the loose resistance can be ensured.

When there is a region where the surfaces of the seal member contact with each other in a state where the seal member is uncompressed, the deformation associated with the compression of the seal member is limited by the contact of the surfaces. For that reason, when the seal member is compressed, there occurs a region where drags are generated against the protrusion part and the opening periphery in correspondence with the contact region of the surfaces aside from the above first contact point and second contact point. Hence, in this seal member, the drags generated against the protrusion part and the opening periphery at the first contact point and the second contact point are affected by the drags generated against the protrusion part and the opening periphery in correspondence with the contact region of the surfaces, immediately after the compression. As in the first aspect, if the surfaces of the seal member do not contact with each other in a state where the seal member is uncompressed, the drags against the protrusion part and the opening periphery at the first contact point and the second contact point are sufficiently increased by a spring property of the seal member. Further, even if the region where the surfaces of the seal member contact with each other occurs due to the compression, the drags of the seal member are maintained. Hence, the drags generated against the protrusion part and the opening periphery at the first contact point and the second contact point are slightly affected by the drags generated against the protrusion part and the opening periphery in correspondence with the contact region of the surfaces, after the contact region of the surfaces occurs. Accordingly, with the use of the seal member according to the first embodiment, the positional relationship between the first contact point and the second contact point in the radial direction is maintained as compared with the seal member having a structure in which the surfaces contact with each other in an uncompressed state. Hence, the frictional force generated against the opening periphery can be maintained to be larger than the frictional force generated against the protrusion part. That is, unless any surface of the seal member contacts with another surface in the uncompressed state, the axial force when the fastening is conducted by the same fastening torque can be increased so that the loose resistance can be ensured.

In the first aspect, the second contact point may be located inside of a maximum outer diameter Dz of a surface of the protrusion part of the metal shell, which faces the seal member. In order to ensure the adhesion between the seal member and each of the protrusion part and the opening periphery when the metal shell is screwed into the mounting hole, it is preferable to ensure the spring property (drags maintained after compression) of the seal member. In order to ensure the spring property, it is desirable that the contact positions of the seal member with the protrusion part and the opening periphery, that is, the positions of the first contact point and the second contact point are both arranged within opposed surfaces of the protrusion part and the opening periphery. Hence, it is preferable that the second contact point located on an outer peripheral side of the first contact point in the radial direction is located inside of (on an inner peripheral side in radial direction) the maximum outer diameter Dz of the protrusion part, which is generally formed in a smaller area than that of the opening periphery.

A second aspect of the invention provides a spark plug, comprising:

a center electrode;

an insulator that has an axial hole and holds the center electrode within a front end side of the axial hole;

a cylindrical metal shell that surrounds and holds the insulator in a circumferential direction, has a screw thread formed in an outer periphery thereof, and has a protrusion part formed closer to a base end side than the screw thread, the protrusion part protruding outward from the outer periphery thereof, and surrounding the outer periphery in a circumferential direction;

a ground electrode that forms a spark discharge gap between the ground electrode and the center electrode; and a seal member that has an annular configuration concentrically mounted on a region of the metal shell between the screw thread and the protrusion part from outside, in which in a state where the metal shell is threadably fitted into an internally threaded mounting hole, the seal member is compressed between the protrusion part and an opening periphery of the mounting hole, and seals a space between the protrusion part and the opening periphery, wherein when the metal shell is threadably fitted into the mounting hole, and the seal member is interposed and compressed between the protrusion part and the opening periphery, the seal member comes into surface contact with each of the protrusion part and the opening periphery, and wherein when the metal shell is removed from the mounting hole, contact traces remaining on the protrusion part and the opening periphery with the seal member are observed, an equivalent friction diameter D1 of the contact traces is obtained through Expression (1) when $d1_o$ represents an outer diameter of the contact trace on the protrusion part side and $d1_h$ represents an inner diameter of the contact trace, and an equivalent friction diameter D2 of the contact traces is obtained through Expression (2) when $d2_o$ represents an outer diameter of the contact trace on the opening periphery side and $d2_h$ represents an inner diameter of the contact trace, D1<D2 is satisfied.

where

Expression (1)

$$D1 = \frac{2(d1_o^3 - d1_h^3)}{3(d1_o^2 - d1_h^2)} \tag{1}$$

-continued

Expression (2)

$$D2 = \frac{2(d2_o^3 - d2_h^3)}{3(d2_o^2 - d2_h^2)} \quad (2)$$

When the spark plug is fitted into the mounting hole of the internal combustion engine, the seal member is compressed between the protrusion part of the metal shell and the opening periphery of the mounting hole, and brought into surface contact with the protrusion part and the opening periphery to maintain the airtight leakage through the mounting hole. If the frictional force between the seal member and each of the protrusion part and the opening periphery is increased, the loose resistance of the metal shell can be ensured. In this example, it has been verified by the present inventors that, when the spark plug is removed, the slippage between the seal member and the opening periphery is liable to occur more than the slippage between the seal member and the protrusion part. Hence, if the frictional force between the seal member and the opening periphery is made higher than the frictional force between the seal member and the protrusion part, the slippage between the seal member and the opening periphery can be suppressed. That is, a return torque necessary for removal of the spark plug can be increased, and the loose of screwing can be suppressed. Under the circumstances, in the second aspect, when the spark plug is removed, contact traces created on the protrusion part and the opening periphery by surface contact with the seal member are observed, and outer diameters and inner diameters thereof are measured to obtain an equivalent friction diameter D1 of the protrusion part side and an equivalent friction diameter D2 of the opening periphery side. In this situation, if D1<D2 is satisfied, the frictional force between the seal member and the opening periphery can be made higher than the frictional force between the seal member and the protrusion part. As a result, the slippage between the seal member and the opening periphery can be suppressed to ensure the loose property. If D1<D2 is satisfied, when the spark plug is attached, the slippage is liable to occur between the seal member and the protrusion part, and the axial force when the fastening is conducted with the same fastening torque can be increased. As a result, the loose resistance can be ensured.

From the above fact, if the contact state of the seal member with the protrusion part and the opening periphery when mounting is adjusted to satisfy D1<D2, the loose resistance can be ensured. For example, in a state immediately before the seal member starts to be compressed by screwing in mounting the spark plug in the mounting hole, a cross section orthogonal to a circumferential direction of the seal member interposed between the protrusion part and the opening periphery is viewed. It is preferable to use the seal member having a cross-sectional shape in which the cross section has one point at which the seal member contacts with each of the protrusion part and the opening periphery, and a point that contacts with the protrusion part is located on an inner peripheral side of a point that contacts with the opening periphery. With the above configuration, a contact of the compressed seal member with the protrusion part is conducted around a position of the point that contacts with the protrusion part, and the equivalent friction diameter D1 of the contact trace can be brought closer to a diameter of a circumference passing through that point. Likewise, a contact of the compressed seal member with the opening periphery is conducted around a point that contacts with the opening periphery, and the equivalent friction diameter D2 of the contact trace can be brought closer to a diameter of a circumference passing through that point. Accordingly, if the point that contacts with the protrusion part is located on the inner peripheral side of the point that contacts with the opening periphery, D1<D2 is liable to be satisfied. The equivalent friction diameter means "a diameter of a circle when an annular contact having a rotating frictional force is replaced with a circular contact having the same rotating frictional force".

In the second aspect, a maximum outer diameter of a surface of the protrusion part of the metal shell, which faces the seal member, is Dz, Dz>D2 may be satisfied. The equivalent friction diameters D1 and D2 correspond to a contact diameter of the seal member and the protrusion part, and a contact diameter of the seal member and the opening periphery, respectively. In order to ensure the adhesion of the seal member to the protrusion part and the opening periphery, it is preferable to ensure the spring property (drags maintained after compression) of the seal member. In order to ensure the spring property, it is desirable that the contact positions of the seal member with the protrusion part and the opening periphery are both arranged within opposed surfaces of the protrusion part and the opening periphery. Hence, it is preferable that the equivalent friction diameters D1 and D2 corresponding to the contact diameters of the protrusion part and the opening periphery are smaller than the maximum outer diameter Dz of the protrusion part which is generally formed in the smaller area than that of the opening periphery, that is, Dz>D2 is satisfied.

In the first aspect and the second aspect, the seal member may be made of stainless steel, and an Ni plated layer may be formed on the surface of the metal shell. With the downsizing and the higher performance of the internal combustion engine, in recent years, the vibration of the internal combustion engine is stronger than the conventional one, and the temperature within the combustion chamber has a tendency to rise as compared with the conventional art. If the stainless steel high in rigidity is used for the seal member, durability against the creep deformation caused by heating and cooling cycles associated with drive and stop of the internal combustion is high and the stainless steel is effective for the seal member. If the Ni plated layer is formed on the surface of the metal shell, the effect of corrosion resistance is obtained. However, the metal shell formed with the Ni plated layer is larger in the frictional force of screw engagement than a general metal shell formed with a Zn plated layer. Hence, there has been known that when the fastening is conducted with the same fastening torque, the axial force generated by fastening becomes smaller than that of the metal shell formed with the Zn plated layer. Under the circumstance, as in the first aspect and the second aspect, the frictional force between the seal member and the opening periphery of the mounting hole is intensified, and further the loose of screwing caused by the creep deformation, which is attributable to the seal member made of stainless steel, is suppressed. With the above configuration, a reduction in the axial force during fastening, which is associated with the formation of the Ni plated layer on the surface of the metal shell is compensated, and further a sufficient return torque (torque larger than the conventional one) is obtained so that the loose resistance can be ensured.

In the spark plug according to the first aspect or the second aspect, when a cross section of the seal member is viewed along a plane including a center axis of the seal member, the cross section of the seal member has a spiral shape that is continuous from one end thereof to the other end thereof, in which the other end is located inside of the one end. In the cross section of the seal member, the seal member includes a first extension part that has one end thereof as the one end of the spiral shape, and extends substantially linearly toward the other end thereof located inside of the seal member in a radial direction more than the one end thereof, so that a component along the radial direction becomes larger than a component along an axial direction of the seal member, a second extension part that extends substantially linearly so that the component along the axial direction becomes larger than the component along the radial direction, a first connection part that connects the other end of the first extension and one end of the second extension part by a curve having a radius of curvature r, a third extension part that extends substantially linearly so that the component along the axial direction becomes larger than the component along the radial direction at a position outside of the second extension part in the radial direction, a second connection part that connects the other end of the second extension part and one end of the third extension part by a curve bent in a direction away from the first extension part, and a third connection part that has one end thereof connected to the other end of the third extension part, and the other end thereof as the other end of the spiral shape, and has a region that is located between the first extension part and the second connection part, and overlaps with the first extension part and the second connection part, in the axial direction. The seal member is located on a side where the first extension part contacts with the extension part of the metal shell, and mounted on the metal shell so that the metal shell is located inside of the second extension part in the radial direction. In a state where the seal member is mounted on the metal shell before the metal shell is screwed into the mounting hole, it is assumed that a height of the seal member in the axial direction is h, and a thickness of the second extension part at a position satisfying h/2 is t. Further, in the radial direction of the seal member, it is assumed that a radial distance of a region of the third extension part, which is farthest from the center axis of the seal member, from the center axis is R1, and a radial distance of a region of the second extension part, which is nearest to the center axis of the seal member, from the center axis is R2. In this case, 2×t≤r≤(R1−R2)/2 may be satisfied, and also h≥(R1−R2) may be satisfied.

A cross-sectional shape of the seal member is defined so that a size of the compressed seal member can be ensured, and a direction of a threaded member in a circumferential direction can be adjusted while maintaining an airtightness caused by the seal member. Specifically, formability of the seal member can be ensured by satisfying 2×t≤r≤(R1−R2)/2. If r≤(R1−R2)/2 is satisfied, a size of the crush margin at the time of compressing the seal member can be ensured, and the direction of the threaded member in the circumferential direction can be adjusted. If h≥(R1−R2) is satisfied, the crush margin can be increased in the center axial direction, and swell of the crushed seal member in the radial direction can be suppressed while ensuring the crush margin.

In the first aspect or the second aspect, in the cross section of the seal member, the above-mentioned other end may be located at a position closer to the center axis than the above-mentioned one end in the radial direction. In the cross-sectional shape of the seal member, if the other end is located at the position closer to the center axis than one end, an equivalent friction diameter with a contact position of the first extension part with the protrusion part, and the center axis as a radius can be made smaller than an equivalent friction diameter with a contact position of the second connection part with the opening periphery, and the center axis as a radius. As a result, the fastening torque at the time of mounting the threaded member can be decreased, and the return torque at the time of removing the threshold member can be increased, and therefore the loose resistance can be ensured.

In the first aspect or the second aspect, when a compression load at the time of compressing the seal member in the axial direction is set as F, and an added pressure P to the seal member is calculated on the basis of $F/\{\pi(R1^2-R2^2)\}$, a rotating angle in screwing the metal shell into the mounting hole when the added pressure P falls within 60 MPa to 130 MPa may be equal to or higher than 90° but lower than 360°. Further, the rotating angle in screwing the metal shell into the mounting hole when the added pressure P falls within 60 MPa to 130 MPa may be equal to or higher than 180° but lower than 360°.

If the rotating angle of 90° or higher can be ensured, the direction of the threaded member in the circumferential direction can be adjusted so that the direction of the threaded member in the circumferential direction does not influence driving of a device to which the threaded member is fitted. Further, if the rotating angle of 180° or higher can be ensured, the direction of the threaded member in the circumferential direction can be adjusted to a direction preferable for the driving of the device to which the threaded member is fitted. The reason that the rotating angle is lower than 360° is because the rotating angle of 360° enables the direction of the threaded member in the circumferential direction to be adjusted in an arbitrary direction, which is necessary and sufficient.

In the first aspect or the second aspect, before the metal shell is screwed into the mounting hole, when a hardness of the seal member is measured at a position of the second extension part which satisfies the h/2, and which is the center of the thickness t in the cross section of the seal member mounted on the metal shell, a Vickers hardness may be equal to or higher than 200 Hv, and equal to or lower than 450 Hv. If the seal member can ensure the Vickers hardness 200 Hv or higher and 450 Hv or lower, the seal member can obtain a sufficient spring property, and a sufficient axial force can be ensured when adjusting the direction of the threaded member in the circumferential direction.

In the first aspect or the second aspect, when the cross section of the seal member that has not yet been mounted on the metal shell is viewed, a direction of the third connection part from one end side toward the other end side may intersect with the axial direction at an angle of 40° or high and 70° or lower. If the direction of the third connection part from one end side toward the other end side intersects with the axial direction at an angle of 40° or high in the section of the seal member, the second extension part and the third extension part are swollen in the radial direction when the seal member is compressed, and the seal member is deformed with the spring property, thereby enabling the sufficient axial force to be ensured. The seal member having the angle larger than 70° is difficult to manufacture.

BRIEF DESCRIPTION OF DRAWINGS

FIG. 15 is a table showing the results of evaluation tests for samples 141 to 144.

DESCRIPTION OF THE INVENTION

Figure 1:
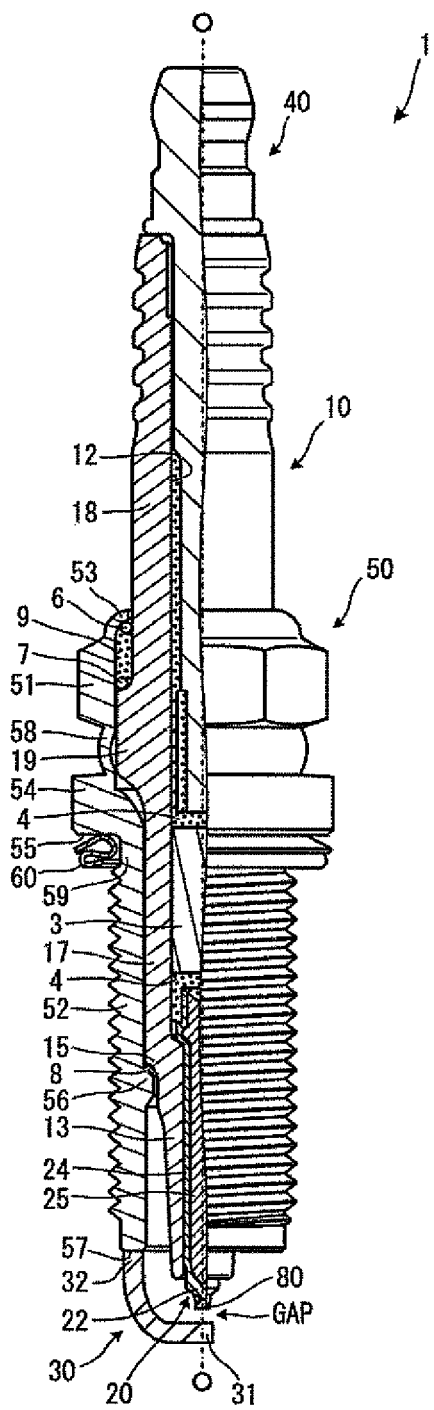
FIG. 1 is a partially cross-sectional view of a spark plug 1.
Figure 2:
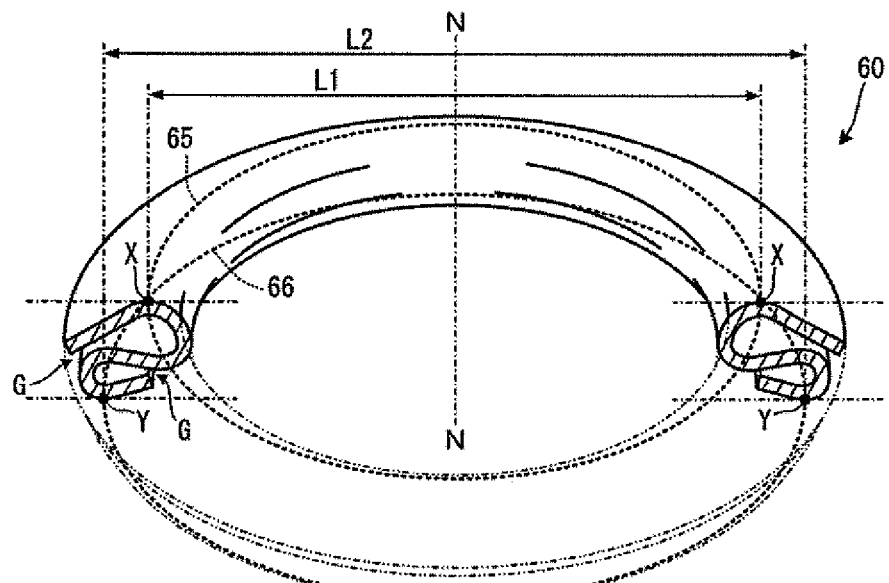
FIG. 2 is a diagram illustrating a cross section and an overall configuration of a gasket 60.

Hereinafter, a spark plug according to a first embodiment of the present invention will be described with reference to the drawings. First, a description will be given of a structure of a spark plug 1 on which a gasket 60 is mounted as an example of a seal member according to the present invention with reference to FIGS. 1 and 2. The spark plug 1 is completed by assembling respective components into a metal shell 50. Hence, for convenience, in the following description, it is assumed that an axial line of the metal shell 50 coincides with an axial line O of the spark plug 1. Referring to FIG. 2, a center axis of the gasket 60 that has not yet been assembled into the spark plug 1 is denoted by N. However, for convenience of description, in a state where the gasket 60 has been assembled into the spark plug 1, it is assumed that the center axis of the gasket 60 coincides with the axial line O. Referring to FIG. 1, a description will be made assuming that a direction of the axial line O of the spark plug 1 is a vertical direction in the drawings, a lower side thereof is a front end side of the spark plug 1, and an upper side thereof is a rear end side.

As illustrated in FIG. 1, the spark plug 1 includes an insulator 10 that holds a center electrode on the front end side within an axial hole 12, and holds a metal terminal 40 on the rear end. The spark plug 1 includes a metal shell 50 that surrounds a radial periphery of the insulator 10 in a circumferential direction, and holds the insulator 10. A front end surface 57 of the metal shell 50 is joined to a ground electrode 30. The ground electrode 30 is bent so that a front end 31 side faces a center electrode 20, and a spark discharge gap GAP is defined between the front end 31 and a metal chip 80 disposed on the center electrode 20.

First, the insulator 10 will be described. The insulator 10 is formed by firing alumina as well known, and is shaped into a cylinder with an axial hole 12 extending in a direction of the axial line O in an axial center. A flange part 19 largest in outer diameter is formed substantially in the center of the insulator 10 in the direction of the axial line O. A rear end barrel part 18 is formed on the rear end side (upper side in FIG. 1) with respect to the flange part 19. A front end barrel part 17 smaller in outer diameter than the rear end barrel part 18 is formed on the front end side (lower side in FIG. 1) with respect to the flange part 19. A leg length part 13 smaller in outer diameter than the front end barrel part 17 is formed on the front end side with respect to the front end barrel part 17. The leg length part 13 is more reduced in outer diameter toward the front end side. When the spark plug 1 is attached to an engine head 90 (refer to FIG. 3) of an internal combustion engine, the leg length part 13 is exposed within a combustion chamber (not shown) of the engine. A stepped part 15 is formed between the leg length part 13 and the front end barrel part 17.

Subsequently, the center electrode 20 will be described. As described above, the insulator 10 holds the center electrode 20 on the front end side of the axial hole 12. The center electrode 20 has a structure in which a metal core 25 made of copper good in thermal conductivity is arranged in the interior of a base material 24 made of a nickel alloy such as INCONEL (trademark) 600 or 601. A front end 22 of the center electrode 20 is protruded from a front end surface of the insulator 10, and reduced in outer diameter toward the front end side. The front end surface of the front end 22 is joined to the metal chip 80 for improvement in a spark consumption resistance. The insulator 10 has a seal body 4 and a ceramic resistor 3 within the axial hole 12. The center electrode 20 is electrically connected to the metal terminal 40 held on the rear end side of the axial hole 12 through the seal body 4 and the ceramic resistor 3. When the spark plug 1 is used, the metal terminal 40 is connected with an ignition coil (not shown) for application of a high voltage.

Subsequently, the ground electrode 30 will be described later. The ground electrode 30 is an electrode made of a metal high in corrosion resistance (as an example, nickel alloy such as INCONEL (trademark) 600 or 601) and shaped into a bar which is substantially rectangular in cross section. The ground electrode 30 has a base part 32 on one end side joined to the front end surface 57 of the metal shell 50 by welding. The ground electrode 30 has the front end 31 side on the other end side bent toward the front end 22 side of the center electrode 20. The spark discharge gap GAP is defined between the front end 31 of the ground electrode 30 and the metal chip 80 of the center electrode 20.

Subsequently, the metal shell 50 will be described. The metal shell 50 is a cylindrical metal made of low carbon steel. As describe above, the metal shell 50 surrounds a periphery of a region extending a part of the rear end barrel part 18 of the insulator 10 to the leg length part 13 to hold the insulator 10. The metal shell 50 includes a tool engaging part 51 to which a spark plug wrench not shown is fitted, and a threaded mounting portion 52 having a thread to be screwed into a female screw of a mounting hole 91 (refer to FIG. 3) of the engine head 90. The metal shell 50 according to this embodiment is fabricated according to the standards under which a nominal diameter of the thread of the mounting portion 52 is M10. The nominal diameter is not limited to M10, but may be M12 or M14, or may be M8. An Ni plated layer is formed on the surface of the metal shell 50.

A protrusion part 54 projected outward in the radial direction in the form of a flange is formed between the tool engaging part 51 and the mounting portion 52 of the metal shell 50. A region between the mounting portion 52 and the protrusion part 54 is called "screw head 59", and the gasket 60, which will be described later, is fitted to the screw head 59.

A thin caulked part 53 is disposed on the rear end side with respect to the tool engaging part 51 of the metal shell 50. As with the caulked part 53, a thin buckled part 58 is disposed between the protrusion part 54 and the tool engaging part 51. A stepped part 56 is formed at a position of the mounting portion 52 in an inner periphery of the metal shell 50. An annular plate packing 8 is arranged on the stepped part 56. Annular ring members 6 and 7 are interposed between an inner peripheral surface of the metal shell 50 and an outer peripheral surface of the rear end barrel part 18 of the insulator 10, which is extended from the tool engaging part 51 to the caulked part 53. A space between the annular ring members 6 and 7 is filled with power of talc (talc) 9. The caulked part 53 is so caulked as to be bent inward, to thereby press the insulator 10 toward the front end side within the metal shell 50 through the annular ring members 6 and 7 and the tale 9. The insulator 10 pressed by the caulked part 53 is integrated with the metal shell 50 while the stepped part 15 is supported by the stepped part 56 of the metal shell 50 through the plate packing 8. Airtightness between the metal shell 50 and the insulator 10 is maintained by the plate packing 8 to prevent combustion gas from being leaked. The above-mentioned buckled part 58 is configured to be bent outward and deformed with addition of the compression force during caulking. A compression length of the talc 9 is lengthened in the direction of the axial line O to enhance the airtightness.

Subsequently, the gasket 60 will be described. The gasket 60 illustrated in FIG. 2 is annularly fabricated by subjecting a single annular plate made of austenitic stainless steel or ferrite stainless steel to a work for folding back in a thickness direction of the plate. When the gasket 60 is mounted on the metal shell 50, a center axis N of the annular gasket 60 is aligned with the direction of the axial line O, and the gasket 60 is fitted to the screw head 59 (refer to FIG. 1). When the metal shell 50 of the spark plug 1 is screwed into the mounting hole 91 of the engine head 90, the gasket 60 is compressed and deformed between an opening periphery 92 of the mounting hole 91 and a seating surface 55 (surface facing gasket 60, refer to FIG. 1) of the protrusion part 54 of the metal shell 50 (refer to FIG. 4). The gasket 60 is brought into close contact with the opening periphery 92 and protrusion part 54 in a full circle, to thereby seal in airtight leakage within the combustion chamber (not shown) through the mounting hole 91.

The gasket 60 can be made of, for example, stainless steel (SUS) having the following standard numbers specified by JIS (Japanese Industrial Standards). As examples of austenitic stainless steel, there can be used SUS201, SUS202, SUS301, SUS301J, SUS302, SUS302B, SUS304, SUS304L, SUS304N1, SUS304N2, SUS304LN, SUS305, SUS309S, SUS310S, SUS316, SUS316L, SUS316N, SUS316LN, SUS316J1, SUS316J1L, SUS317, SUS317L, SUS317J1, SUS321, SUS347, SUSXM15J1, and so on. As examples of ferrite stainless steel, SUS405, SUS410L, SUS429, SUS430, SUS430LX, SUS430JIL, SUS434, SUS436L, SUS436JIL, SUS444, SUS445J1, SUS445J2, SUS447J1, SUSXM27, and so on. The gasket 60 made of the above-mentioned stainless steel is high in rigidity as compared with generally used gaskets made of Fe. Hence, durability against the creep deformation caused by heating and cooling cycles associated with drive and stop of the engine is high, and the loose of screwing caused by deformation of the gasket is difficult to occur.

Incidentally, in the first embodiment, the Ni plated layer is formed on the surface of the metal shell 50 for the purpose of enhancing the corrosion resistance. On the other hand, a Zn plated layer is formed on the surface of the generally used metal shells. The metal shell on which the Ni plated layer is formed is large in frictional force caused by engagement of the screw as compared with the metal shell on which the Zn plated layer is formed. There has been known that, when fastening is conducted with the same fastening torque, in the metal shell on which the Ni plated layer is formed, an axial force generated by fastening is smaller than that of the metal shell on which the Zn plated layer is formed.

In order to suppress the loose of screwing caused by making it difficult to ensure a sufficient axial force during the fastening by forming the Ni plated layer on the surface of the metal shell, it is preferable to intensify the frictional forces between the gasket and each of the metal shell and the engine head. It is preferable that the return torque necessary to remove (loose) the screw is increased. Under the circumstances, the present inventors have observed, with the use of an aluminum bush imitating the engine head, a status of slippage occurring between the gasket and each of the metal shell and the aluminum bush when the metal shell is screwed into the mounting hole formed in the aluminum bush. As a result, it has been found that, during the fastening, the slippage is liable to occur between the gasket and the metal shell, and the slippage is difficult to occur between the gasket and the aluminum bush. On the other hand, it has been found that, during loosening, the slippage is difficult to occur between the gasket and the metal shell, and the slippage is liable to occur between the gasket and the aluminum bush. From the above fact, if the frictional force between the gasket and the aluminum bush, that is, the engine head is made higher than the frictional force between the gasket and the metal shell, the resistance (loose resistance) against the loose of screwing can be enhanced.

Under the circumstances, in the first embodiment, the configuration of the gasket 60 is prescribed as follows. First, as illustrated in FIG. 2, let us consider a state in which the gasket 60 is unused as a product, that is, the gasket 60 has not yet been compressed (uncompressed). In the gasket 60 of this state, it is prescribed that any surface of the gasket 60 fabricated by folding back the annular plate in the thickness direction comes out of contact with other surfaces thereof (hereinafter, for convenience, also referred to as "prescription"). In other words, it is prescribed that when a cross section orthogonal to the circumferential direction of the unused gasket 60 is viewed, the surfaces of the gasket 60, which face each other by folding back the plate, are out of contact with each other (a gap G is defined in a portion where the surfaces face each other as illustrated in FIG. 2)

Figure 3:
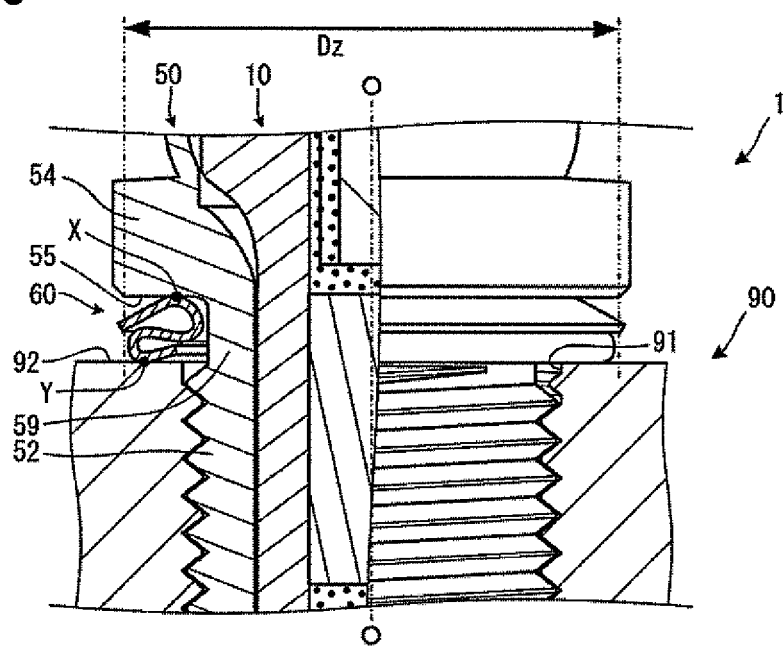
FIG. 3 is a partial cross-sectional view illustrating a state in which the spark plug 1 is attached to an engine head 90, and a gasket 60 is uncompressed while being interposed between a protrusion part 54 of a metal shell 50 and an opening periphery 92 of a mounting hole 91.

Further, as illustrated in FIG. 3, in a process where the spark plug 1 is screwed into the mounting hole 91 of the engine head 90, the gasket 60 is uncompressed while being interposed between the protrusion part 54 of the metal shell 50 and the opening periphery 92 of the mounting hole 91. The gasket 60 is viewed in the cross section along the direction of the axial line O (cross section of spark plug 1 including axial line O). In this situation, it is prescribed that the gasket 60 with the seating surface 55 of the protrusion part 54 contact with each other at one point of X, and the gasket 60 and the opening periphery 92 contact with each other at one point of Y. It is prescribed that the point Y is located outside of (on a side farther than the axial line O) the point X in the radial direction (hereinafter, for convenience, also referred to as "prescription 2"). As illustrated in FIG. 3, it is prescribed that the point X is located inside (on the axial line O side) of the maximum outer diameter Dz of the seating surface 55 of the protrusion part 54 (hereinafter, for convenience, also referred to as "prescription 3"). The points X and Y correspond to "first contact point" and "second contact point" in the present invention, respectively.

Figure 4:
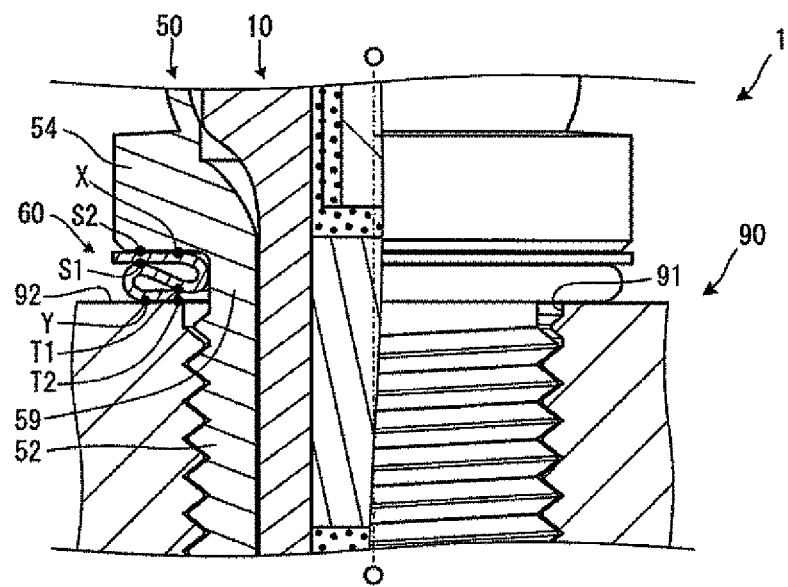
FIG. 4 is a partial cross-sectional view illustrating a state in which the spark plug 1 is attached to the engine head 90, and the gasket 60 is interposed and compressed between the protrusion part 54 of the metal shell 50 and the opening periphery 92 of the mounting hole 91.

First, the prescription 2 will be described. The gasket 60 according to the first embodiment is fabricated by subjecting the annular plate to a folding process. As illustrated in FIG. 3, when being viewed by a circumferential cross section, the gasket 60 is shaped so that the gasket 60 contacts with the seating surface 55 of the protrusion part 54 at one point X. Hence, as illustrated in FIG. 2, when the compression starts, the gasket 60 comes in linear contact with the seating surface 55 of the protrusion part 54 as illustrated in FIG. 3, by a virtual circle 65 drawn by the point X over an overall circumference of the gasket 60 as illustrated in FIG. 2. Likewise, as illustrated in FIG. 3, when being viewed by a circumferential cross section, the gasket 60 is formed so that the gasket 60 contacts with the opening periphery 92 at one point Y. Hence, when the compression starts, the gasket 60 comes in linear contact with the opening periphery 92, by a virtual circle 66 drawn by the point Y over the overall circumference of the gasket 60 as illustrated in FIG. 2. The gasket 60 fabricated by folding back the plate has the spring property. Referring to FIG. 3, when the metal shell 50 is fastened to the engine head 90 to compress the gasket 60 in the direction of the axial line O, the gasket 60 is subjected to a load from the spring force between the point X (virtual circle 65) and the point Y (virtual circle 66). As illustrated in FIG. 4, when the metal shell 50 is fastened by the engine head 90, and the gasket 60 is compressed between the protrusion part 54 and the opening periphery 92, the gasket 60 is deformed (crushed) mainly on the folded portion of the plate having the spring property. An influence of the deformation is small at the positions of the points X and Y, and a positional relationship between the points X and Y in the radial direction is maintained.

In this example, as described above, when the metal shell 50 is fastened to the engine head 90, the slippage is liable to occur between the gasket 60 and the metal shell 50, but the slippage is difficult to occur between the gasket 60 and the engine head 90. Under the circumstances, the frictional force generated between the gasket 60 and the metal shell 50 is set to be smaller than the frictional force generated between the gasket 60 and the engine head 90. Then, if the slippage between the gasket 60 and the metal shell 50 becomes smoother, the metal shell 50 can be easily fastened. On the other hand, as described above, when the metal shell 50 is loosened from the engine head 90, the slippage is difficult to occur between the gasket 60 and the metal shell 50, and the slippage is liable to occur between the gasket 60 and the engine head 90. Under the circumstances, the frictional force generated between the gasket 60 and the engine head 90 is set to be larger than the frictional force generated between the gasket 60 and the metal shell 50. If the slippage between the gasket 60 and the engine head 90 is suppressed, the fastening of the metal shell 50 can be difficult to loose.

Accordingly, the frictional force generated between the gasket 60 and the opening periphery 92 along the virtual circle 66 is set to be larger than the frictional force generated between the gasket 60 and the seating surface 55 of the protrusion part 54 along the virtual circle 65. With this configuration, the metal shell 50 and the engine head 90 can be easily fastened to each other, and the fastening can be difficult to loose. In order to realize this, a diameter L2 of the virtual circle 66 drawn by the point Y that contacts with the opening periphery 92 can be set to be larger than a diameter L1 of the virtual circle 65 drawn by the point X that contacts with the seating surface 55 of the protrusion part 54. That is, as prescribed in the prescription 2, when the gasket 60 is viewed by the circumferential cross section (cross section including the axial line O), the uncompressed gasket 60 can contact with the seating surface 55 of the protrusion part 54 and the opening periphery 92 at the respective ones of the points X and Y. The point Y can be located outside of the point X in the radial direction.

Subsequently, the prescription 1 will be described. As illustrated in FIG. 3, when the gasket 60 according to the first embodiment is in an uncompressed state where the metal shell 50 has not yet been fastened to the engine head 90, any surface of the gasket 60 comes out of other surfaces thereof. That is, the surfaces facing each other by folding the plate have the gap G (refer to FIG. 2) therebetween, and come out of contact with each other. In an initial stage of compression, the gasket 60 contacts with the seating surface 55 of the protrusion part 54 at one point X. Therefore, a known equivalent friction diameter (ditto) which is an index for evaluating a substantial frictional force generated between the gasket 60 and the seating surface 55 of the protrusion part 54 is studied. In this case, the diameter of the virtual circle 65 corresponds to an equivalent friction diameter between the gasket 60 and the seating surface 55 of the protrusion part 54. Likewise, the diameter of the virtual circle 66 corresponds to an equivalent friction diameter between the gasket 60 and the opening periphery 92.

As illustrated in FIG. 4, when the metal shell 50 is fastened, and the gasket 60 is compressed between the protrusion part 54 and the opening periphery 92 in the direction of the axial line O, the gasket 60 is first deformed (crushed) mainly on the folded portion of the plate having the spring property. When the gasket 60 is further compressed, the surfaces of the gasket 60, which face each other in the direction of the axial line O, come into contact with each other. Specifically, in the first embodiment, there is no gap G (refer to FIG. 2) at the positions of points S1 and T1, and the surfaces of the gasket 60 contact with each other. Then, a drag starts to occur against the seating surface 55 of the protrusion part 54 at a position of a point S2 corresponding to a position of the point S1 in the direction of the axial line O. Likewise, the drag starts to occur against the opening periphery 92 at a position of a point T2 corresponding to a position of the point T1. For that reason, the deformation of the plate on the folded portion is limited, and when the gasket 60 comes into contact with the seating surface 55 of the protrusion part 54 and the opening periphery 92 at the points S2 and T2, the drags start to occur therebetween. As a result, the equivalent friction diameter between the gasket 60 and the seating surface 55 of the protrusion part 54 becomes larger than the diameter of the virtual circle 65. The equivalent friction diameter between the gasket 60 and the opening periphery 92 becomes smaller than the diameter of the virtual circle 66.

However, the respective drags against the seating surface 55 of the protrusion part 54 and the opening periphery 92 at the positions of the points X and Y are sufficiently intensified by the spring property of the folded portion of the plate until the surfaces contact with each other at the positions of the points S1 and T1, and the drags are maintained after the contact. Hence, as compared with the gasket having a structure in which the surfaces contact with each other in the uncompressed state unlike the first embodiment, the equivalent friction diameter between the gasket 60 and the seating surface 55 of the protrusion part 54 becomes larger than the diameter of the virtual circle 65, but becomes closer in size to the latter. The equivalent friction diameter between the gasket 60 and the opening periphery 92 becomes smaller than the diameter of the virtual circle 66, but becomes closer in size to the latter. Accordingly, as compared with the gasket having the structure in which the surfaces contact with each other in the uncompressed state, the gasket 60 according to the first embodiment can be maintain in a state in which the frictional force generated between the gasket 60 and the opening periphery 92 is larger than the frictional force generated between the gasket 60 and the seating surface 55 of the protrusion part 54. That is, as prescribed in the prescription 1, if any surface of the gasket 60 does not contact with other surfaces in the state where the gasket 60 is uncompressed, the metal shell 50 and the engine head 90 can be easily fastened to each other, and the fastening can be difficult to loose.

Subsequently, the prescription 3 will be described. In order to ensure the adhesion between the gasket 60 and each of the protrusion part 54 and the opening periphery 92 when the metal shell 50 is fastened into the engine head 90, it is preferable to ensure the spring property (drags maintained after compression) of the gasket 60. In order to ensure the spring property, it is desirable that the contact positions of the gasket 60 with the protrusion part 54 and the opening periphery 92, that is, the positions of the points X and Y are both arranged within opposed surfaces of the protrusion part 54 and the opening periphery 92. Hence, it is preferable that the point Y located on an outer peripheral side of the point X is located inside of (on an inner peripheral side in radial direction) the maximum outer diameter Dz of the protrusion part 54, which is generally formed in a smaller area than that of the opening periphery 92.

Figure 5:
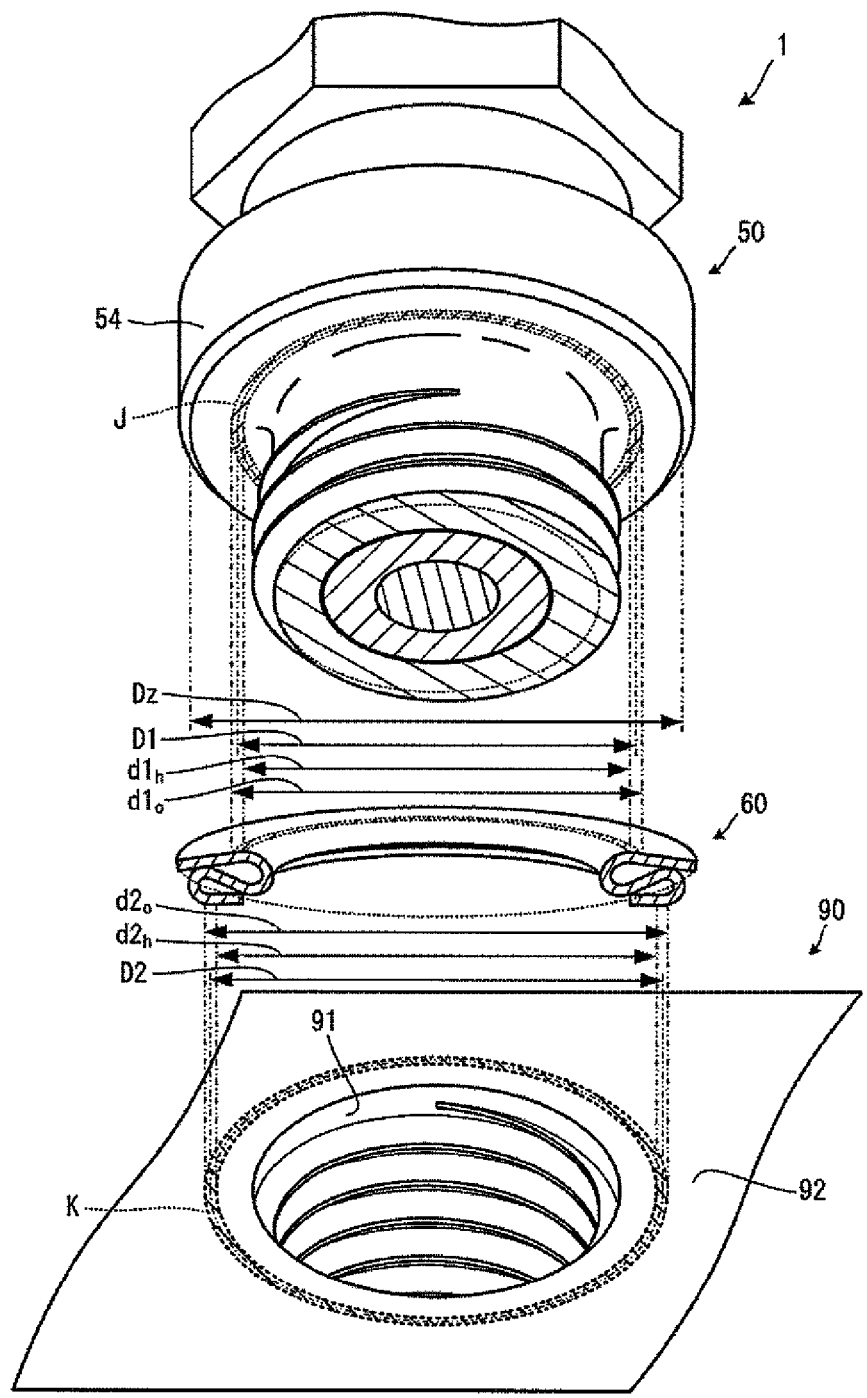
FIG. 5 is a diagram illustrating contact traces J and K remaining on the protrusion part 54 of the metal shell 50 and the opening periphery 92 of the mounting hole 91 with the gasket 60 when the spark plug 1 is removed from the engine head 90.

Further, in the first embodiment, the following prescription is provided on the basis of a result of the embodiment which will be described later. As illustrated in FIG. 4, the metal shell 50 is screwed into the mounting hole 91, and the gasket 60 is interposed and compressed between the protrusion part 54 and the opening periphery 92. The gasket 60 crushed by the compression comes into surface contact with each of the protrusion part 54 and the opening periphery 92. Then, as illustrated in FIG. 5, the metal shell 50 is removed from the mounting hole 91 to observe a contact trace J remaining in the protrusion part 54 with the gasket 60 and a contact trace K remaining in the opening periphery 92 with the gasket 60. When it is assumed that an outer diameter of the contact trace J on the protrusion part 54 side is $d1_o$, and an inner diameter thereof is $d1_h$, the equivalent friction diameter D1 of the contact trace J is obtained by Expression (1).

[Ex. 3]

$$D1 = \frac{2(d1_o^3 - d1_h^3)}{3(d1_o^2 - d1_h^2)} \quad (1)$$

When it is assumed that an outer diameter of the contact trace K on the opening periphery 92 side is $d2_o$, and an inner diameter thereof is $d2_h$, likewise, the equivalent friction diameter D2 of the contact trace K is obtained by Expression (2).

[Ex. 4]

$$D2 = \frac{2(d2_o^3 - d2_h^3)}{3(d2_o^2 - d2_h^2)} \quad (2)$$

where D1<D2 is satisfied.

When the spark plug 1 is fitted into the mounting hole 91 of the engine head 90, the gasket 60 is compressed between the protrusion part 54 of the metal shell 50 and the opening periphery 92 of the mounting hole 91. The gasket 60 comes in surface contact with the protrusion part 54 and the opening periphery 92 to maintain the airtight leakage through the mounting hole 91. If the frictional force between the gasket 60 and each of the protrusion part 54 and the opening periphery 92 is intensified, the loose resistance of the metal shell 50 can be ensured. In this example, it has been verified by the present inventors that if the spark plug 1 is removed, slippage between the gasket 60 and the opening periphery 92 is liable to occur more than slippage between the gasket 60 and the protrusion part 54. Hence, if the frictional force between the gasket 60 and the opening periphery 92 is set to be higher than the frictional force between the gasket 60 and the protrusion part 54, the slippage between the gasket 60 and the opening periphery 92 can be suppressed. That is, the return torque necessary for removal of the spark plug 1 can be increased, and the loose of screwing can be suppressed. Under the circumstances, when the spark plug 1 is removed, the contact traces J and K produced on the protrusion part 54 and the opening periphery 92 by the surface contact with the gasket 60 are observed. The outer diameters $d1_o$ and $d2_o$, and the inner diameters $d1_h$ and $d2_h$ are measured to obtain the equivalent friction diameter D1 on the protrusion part 54 side and the equivalent friction diameter D2 on the opening periphery 92 side as described above. In this situation, if D1<D2 is satisfied, the frictional force between the gasket 60 and the opening periphery 92 can be set to be higher than the frictional force between the gasket 60 and the protrusion part 54. As a result, the slippage between the gasket 60 and the opening periphery 92 can be suppressed to ensure the loose resistance.

As described above, the gasket 60 is made of stainless steel, and the Ni plated layer is formed on the surface of the metal shell 50. The gasket 60 made of stainless steel is high in durability against the creep deformation caused by heating and cooling cycles associated with drive and stop of the engine, and effective. If the Ni plated layer is formed on the surface of the metal shell 50, the effect of corrosion resistance is obtained. However, as described above, the metal shell 50 formed with the Ni plated layer is reduced in the axial force generated by fastening. Under the circumstance, as in the first embodiment, if D1<D2 is satisfied, the frictional force between the gasket 60 and the opening periphery 92 of the mounting hole 91 is intensified. Further, the loose of screwing caused by the creep deformation, which is attributable to the gasket 60 made of stainless steel, is suppressed. With the above configuration, a reduction in the axial force during fastening, which is associated with the formation of the Ni plated layer on the surface of the metal shell 50, is compensated, and a sufficient return torque (torque larger than the conventional one) is obtained so that the loose resistance can be ensured.

As illustrated in FIG. 5, it is preferable that the maximum outer diameter Dz of a surface of the protrusion part 54 of the metal shell 50, which faces the gasket 60, satisfies Dz>D2. The equivalent friction diameters D1 and D2 correspond to a contact diameter of the gasket 60 with the protrusion part 54, and a contact diameter of the gasket 60 with the opening periphery 92, respectively. In order to ensure the adhesion between the gasket 60 and each of the protrusion part 54 and the opening periphery 92, it is preferable to ensure the spring property (drags maintained after compression) of the gasket 60. In order to ensure the spring property, it is desirable that the contact positions of the gasket 60 with the protrusion part 54 and the opening periphery 92 are both arranged within opposed surfaces of the protrusion part 54 and the opening periphery 92. Hence, it is preferable that the equivalent friction diameters D2 corresponding to the contact diameters of the gasket 60 with the opening periphery 92 are smaller than the maximum outer diameter Dz of the protrusion part 54 generally formed in a smaller area than that of the opening periphery 92, that is, Dz>D2 is satisfied.

In this way, in mounting the spark plug 1 on the engine head 90, the contact trace J of the gasket 60 with the protrusion part 54 of the metal shell 50, and the contact trace K of the gasket 60 with the opening periphery 92 of the mounting hole 91 when the spark plug 1 is removed are observed. The equivalent friction diameter D1 of the contact trace J and the equivalent friction diameter D2 of the contact trace K are obtained, and that the return torque can be increased when D1<D2 is satisfied has been confirmed through the following examples.

Example 1

Figure 16:
FIG. 16 is a table showing cross-sectional shapes of gaskets for a spark plug.
Figure 16:
Figure 16:
Figure 16:
Figure 16:
Figure 16:

As a sample 1 of the spark plug, a spark plug in which a nominal diameter of the thread of the mounting part of the metal shell is M10, and the Zn plated layer is formed on the surface thereof is prepared, and a gasket made of stainless steel and having an S-shaped cross section illustrated by a type A in Table 1 (FIG. 16) is assembled into the spark plug. In all of the cross sections of the gaskets shown in Table 1, a right hand side is indicative of an inner peripheral side, and a left hand side is indicative of an outer peripheral side. It is assumed that the gasket is attached to the metal shell while an upper side thereof faces the protrusion part side of the metal shell. That is, the gasket of a type A1 is attached to the spark plug in the same direction as that of the gasket 60 in FIG. 1.

This sample 1 is attached to an aluminum bush with a fastening torque of 10 N·m, then removed therefrom, and the contact trace K remaining in the opening periphery is observed. Further, a new gasket of the type A1 is assembled into the spark plug of the sample 1 while reversing an assembling direction. Likewise, attachment and detachment of the spark plug with respect to the aluminum bush are conducted. The contact trace remaining in the opening periphery of the aluminum bush is equivalent to the contact trace J of the gasket with the protrusion part, and observed as the contact trace J. The outer diameter $d1_o$ of the contact trace J is 11.473 mm, and the inner diameter $d1_h$ is 10.890 mm. The calculated equivalent friction diameter D1 of the contact trace J is 11.184 mm. The outer diameter $d2_o$ of the contact trace K is 12.304 mm, and the inner diameter $d2_h$ is 11.693 mm. The calculated equivalent friction diameter D2 of the contact trace K is 12.001 mm. The obtained equivalent friction diameter ratio (D2/D1) is 1.07, and D1<D2 is satisfied.

As shown in Table 1, a gasket of a type A2 having an assembling direction of the gasket opposite to that of the type A1 is prepared, and assembled into the same spark plug as that of the sample 1 as a sample 2. Likewise, in the sample 2, attachment and detachment of the spark plug with respect to the aluminum bush are conducted, and the contact trace J and the contact trace K are observed. The obtained equivalent friction diameter ratio (D2/D1) of the equivalent friction diameter D1 of the contact trace J and the equivalent friction diameter D2 of the contact trace K in the sample 2 is 0.93, and D1≧D2 is satisfied in the sample 2.

A gasket made of stainless steel having a cross-sectional shape illustrated in a column of a type B1 in Table 1 is prepared, and assembled into the same spark plug as that of the sample 1 in a direction of Table 1 (direction in which the right hand side of cross-sectional shape is inner peripheral side) as a sample 3. Further, a gasket of a type B2 reversing the gasket of the type B1 is prepared, and assembled into the same spark plug as that of the sample 1 as a sample 4. Likewise, a gasket made of stainless steel having a cross-sectional shape illustrated in a column of a type C1 in Table 1 is prepared, and assembled into the same spark plug as that of the sample 1 in a direction of Table 1 (direction in which the right hand side of cross-sectional shape is inner peripheral side) as a sample 5. Further, a gasket of a type C2 reversing the gasket of the type C1 is prepared, and assembled into the same spark plug as that of the sample 1 as a sample 6. Likewise, in each of the samples 3 to 6, attachment and detachment of the spark plug with respect to the aluminum bush are conducted, and the contact trace J and the contact trace K are observed. The equivalent friction diameter ratios (D2/D1) of the equivalent friction diameters D1 of the contact traces J and the equivalent friction diameters D2 of the contact traces K in the samples 3 to 6 are 1.05, 0.95, 1.06, and 0.95 in order. D1<D2 is satisfied in the samples 3 and 5, and D1≧D2 is satisfied in the samples 4 and 6. The compiled equivalent friction diameter ratios in the samples 1 to 6 are shown in Table 2.

TABLE 2

| Samples | Nominal diameter | Cross-sectional shapes of gasket | Equivalent friction diameter ratios D2/D1 | Comparison results | Return torque/fastening torque |
|---|---|---|---|---|---|
| 1 | M10 | A1 | 1.07 | D1 < D2 | 0.77 |
| 2 |  | A2 | 0.93 | D1 ≧ D2 | 0.43 |
| 3 |  | B1 | 1.05 | D1 < D2 | 0.71 |
| 4 |  | B2 | 0.95 | D1 ≧ D2 | 0.45 |
| 5 |  | C1 | 1.06 | D1 < D2 | 0.72 |
| 6 |  | C2 | 0.94 | D1 ≧ D2 | 0.44 |

Subsequently, each of the samples 1 to 6 newly fabricated under the same conditions as those described above is attached to a newly prepared aluminum bush with a fastening torque of 10 N·m, and heated at 200° C. while being vibrated under vibration conditions complying with ISO11565 for 16 hours. Thereafter, each sample is removed from the aluminum bush, and each return torque applied during detachment is measured. In each of the samples, a ratio (return torque/fastening torque) of the return torque to the fastening torque is obtained (refer to Table 2). A relationship between the ratio of the return torque to the fastening torque and the equivalent friction diameter ratio, which is obtained as a result of evaluation tests conducted on the samples 1 to 6 in which the nominal diameter is M10, is shown in a graph of FIG. 6. Numbers attached in the graph of FIG. 6 indicate sample Nos., and parenthetic symbols added to those numerals indicate the types of the cross-sectional shapes of the gasket.

Figure 6:
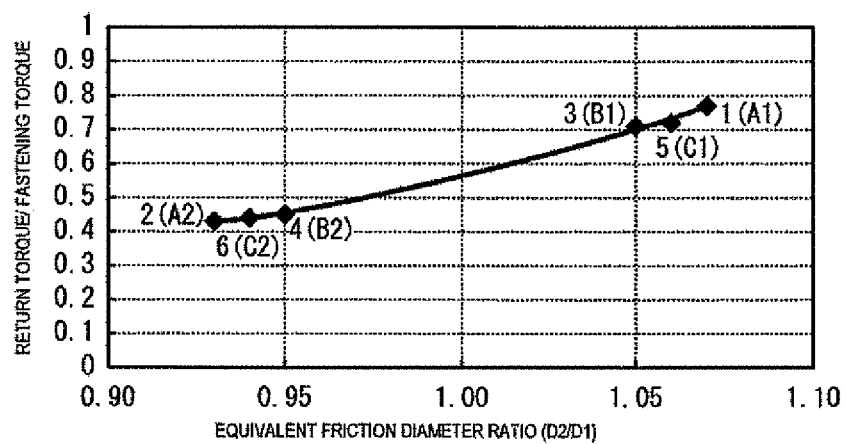
FIG. 6 is a graph illustrating a relationship between a ratio of a return torque to a fastening torque and an equivalent friction diameter ratio in a spark plug having a nominal diameter M10.

As shown in Table 2, the samples 1, 3, and 5 into which the gaskets of the types A1, B1, and C1 are assembled, respectively, are 0.71 to 0.77 in the ratio of the return torque to the fastening torque. On the contrary, the samples 2, 4, and 6 into which the gaskets of the types A2, B2, and C2 are assembled, respectively, are 0.43 to 0.45 in the ratio of the return torque to the fastening torque. As illustrated in FIG. 6, evidently, the samples 1, 3, and 5 into which the gaskets of the types A1, B1, and C1 are assembled are larger than the samples 2, 4, and 6 into which the gaskets of the types A2, B2, and C2 are assembled, in the ratio of the return torque to the fastening torque. All of the gaskets of the types A1, B1, and C1 are larger than 1 in the equivalent friction diameter ratio (D2/D1), and satisfies D1<D2. On the other hand, all of the gaskets of the types A2, B2, and C2 are equal to or lower than 1 in the equivalent friction diameter ratio (D2/D1), and satisfies D1≥D2. As described above, all of the gaskets of the types A2, B2, and C2 merely reverse the assembling direction of the gaskets of the types A1, B1, and C1. From this face, it is evidently found that the gasket that is larger than 1 in the equivalent friction diameter ratio and can satisfy D1<D2 can increase the ratio of the return torque to the fastening torque.

Example 2

In a spark plug in which a nominal diameter of the thread of the mounting part is M12, as in the example 1, samples 7 to 12 into which the gaskets of the types A1 to C2 are assembled are prepared, and the equivalent friction diameter ratios are confirmed. The Zn plated layer is formed on the surface of the metal shell as in the example 1. In each of the samples 7 to 12, attachment and detachment of the spark plug with respect to the aluminum bush are conducted, and the contact trace J and the contact trace K are observed. The equivalent friction diameter ratios (D2/D1) of the equivalent friction diameters D1 of the contact traces J and the equivalent friction diameters D2 of the contact traces K in the samples 7 to 12 are 1.06, 0.94, 1.04, 0.96, 1.05, and 0.95 in order. D1<D2 is satisfied in the samples 7, 9 and 11, and D1≥D2 is satisfied in the samples 8, 10, and 12. The compiled equivalent friction diameter ratios in the samples 7 to 12 are shown in Table 3.

TABLE 3

| Samples | Nominal diameter | Cross-sectional shapes of gasket | Equivalent friction diameter ratios D2/D1 | Comparison results | Return torque/ fastening torque |
|---|---|---|---|---|---|
| 7 | M12 | A1 | 1.07 | D1 < D2 | 0.56 |
| 8 | | A2 | 0.94 | D1 ≥ D2 | 0.38 |
| 9 | | B1 | 1.04 | D1 < D2 | 0.53 |
| 10 | | B2 | 0.96 | D1 ≥ D2 | 0.40 |
| 11 | | C1 | 1.05 | D1 < D2 | 0.52 |
| 12 | | C2 | 0.95 | D1 ≥ D2 | 0.39 |

Subsequently, each of the samples 7 to 12 newly fabricated under the same conditions as those described above is attached to a newly prepared aluminum bush with a fastening torque of 15 N·m, and heated at 200° C. while being vibrated under vibration conditions complying with ISO11565 for 16 hours. Thereafter, the return torque of each sample is measured, and the ratio of the return torque to the fastening torque (return torque/fastening torque) is obtained (refer to Table 3). A relationship between the ratio of the return torque to the fastening torque and the equivalent friction diameter ratio, which is obtained as a result of evaluation tests conducted on the samples 7 to 12 in which the nominal diameter is M12, is shown in a graph of FIG. 7 (numbers in the graph are identical with those in of FIG. 6).

Figure 7:
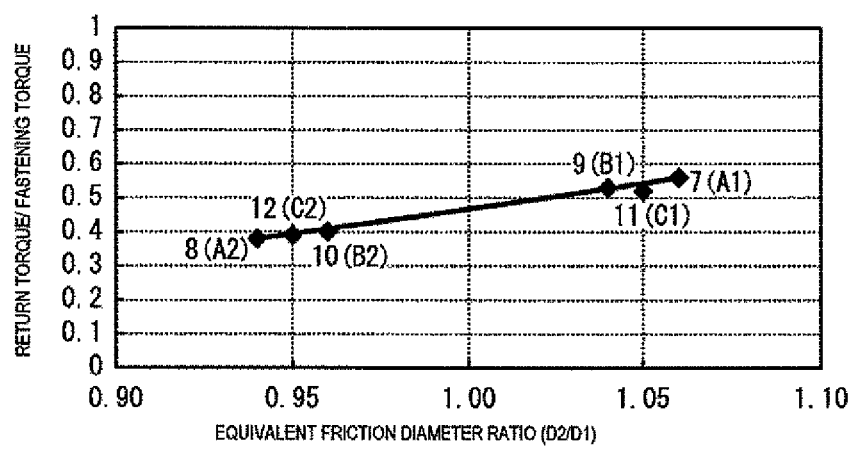
FIG. 7 is a graph illustrating a relationship between the ratio of the return torque to the fastening torque and the equivalent friction diameter ratio in the spark plug having a nominal diameter M12.

As shown in Table 3, the samples 7, 9, and 11 into which the gaskets of the types A1, B1, and C1 are assembled, respectively, are 0.52 to 0.56 in the ratio of the return torque to the fastening torque. On the contrary, the samples 8, 10, and 12 into which the gaskets of the types A2, B2, and C2 are assembled, respectively, are 0.38 to 0.40 in the ratio of the return torque to the fastening torque. As illustrated in FIG. 7, evidently, the samples 7, 9, and 11 into which the gaskets of the types A1, B1, and C1 are assembled are larger than the samples 8, 10, and 12 into which the gaskets of the types A2, B2, and C2 are assembled, in the ratio of the return torque to the fastening torque. Thus, even in the spark plug of M12, the same results as those in the spark plug of M10 are obtained. It has been confirmed that if the gasket is larger than 1 in the equivalent friction diameter ratio (D2/D1) and can satisfy D1<D2, the ratio of the return torque to the fastening torque can be increased even in the spark plug of M12.

Example 3

Further, even in a spark plug in which the nominal diameter of the thread of the mounting part is M14, as in the examples 1 and 2, samples 13 to 18 into which the gaskets of the types A1 to C2 are assembled are prepared, and the equivalent friction diameter ratios are confirmed. The Zn plated layer is formed on the surface of the metal shell as in the examples 1 and 2. In each of the samples 13 to 18, attachment and detachment of the spark plug with respect to the aluminum bush are conducted, and the contact trace J and the contact trace K are observed. The equivalent friction diameter ratios (D2/D1) of the equivalent friction diameters D1 of the contact traces J and the equivalent friction diameters D2 of the contact traces K in the samples 13 to 18 are 1.05, 0.95, 1.03, 0.97, 1.04, and 0.96 in order. D1<D2 is satisfied in the samples 13, 15, and 17, and D1≥D2 is satisfied in the samples 14, 16, and 18. The compiled equivalent friction diameter ratios in the samples 13 to 18 are shown in Table 4.

TABLE 4

| Samples | Nominal diameter | Cross-sectional shapes of gasket | Equivalent friction diameter ratios D2/D1 | Comparison results | Return torque/ fastening torque |
|---|---|---|---|---|---|
| 13 | M14 | A1 | 1.05 | D1 < D2 | 0.71 |
| 14 | | A2 | 0.95 | D1 ≥ D2 | 0.56 |
| 15 | | B1 | 1.03 | D1 < D2 | 0.67 |
| 16 | | B2 | 0.97 | D1 ≥ D2 | 0.60 |
| 17 | | C1 | 1.04 | D1 < D2 | 0.66 |
| 18 | | C2 | 0.96 | D1 ≥ D2 | 0.57 |

Subsequently, each of the samples 13 to 18 newly fabricated under the same conditions as those described above is attached to a newly prepared aluminum bush with a fastening torque of 20 N·m, and heated at 200° C. while being vibrated under vibration conditions complying with ISO11565 for 16 hours. Thereafter, the return torque of each sample is measured, and the ratio of the return torque to the fastening torque (return torque/fastening torque) is obtained (refer to Table 4). A relationship between the ratio of the return torque to the fastening torque and the equivalent friction diameter ratio, which is obtained as a result of evaluation tests conducted on the samples 13 to 18 in which the nominal diameter is M14, is shown in a graph of FIG. 8 (numbers in the graph are identical with those in of FIG. 6).

Figure 8:
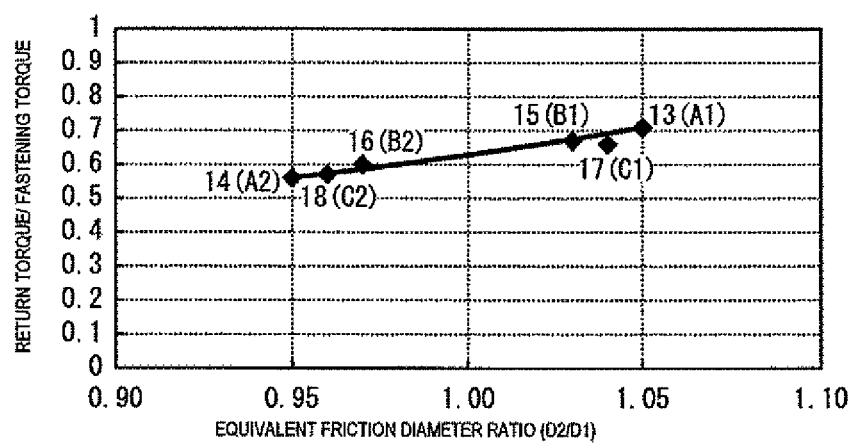
FIG. 8 is a graph illustrating a relationship between the ratio of the return torque to the fastening torque and the equivalent friction diameter ratio in the spark plug having a nominal diameter M14.

As shown in Table 4, the samples 13, 15, and 17 into which the gaskets of the types A1, B1, and C1 are assembled, respectively, are 0.66 to 0.71 in the ratio of the return torque to the fastening torque. On the contrary, the samples 14, 16, and 18 into which the gaskets of the types A2, B2, and C2 are assembled, respectively, are 0.56 to 0.60 in the ratio of the return torque to the fastening torque. As illustrated in FIG. 8, evidently, the samples 13, 15, and 17 into which the gaskets of the types A1, B1, and C1 are assembled are larger than the samples 14, 16, and 18 into which the gaskets of the types A2, B2, and C2 are assembled, in the ratio of the return torque to the fastening torque. Thus, even in the spark plug of M14, the same results as those in the spark plugs of M10 and M12 are obtained. It has been confirmed that if the gasket is larger than 1 in the equivalent friction diameter ratio (D2/D1) and can satisfy D1<D2, the ratio of the return torque to the fastening torque can be increased even in the spark plug of M14.

Example 4

Subsequently, in a spark plug in which the Ni plated layer is formed on the surface of the metal shell, and a gasket made of stainless steel is assembled, a hot vibration loose test has been conducted in order to confirm that the return torque is obtained. In this example, five types of samples of the spark plugs are prepared. In a sample 21, the Zn plated layer is formed on the metal shell, and a gasket of the type A1, which is made of Fe, is assembled into the metal shell. In a sample 22, the Ni plated layer is formed on the metal shell, and a gasket of the type A1, which is made of Fe, is assembled into the metal shell. In a sample 23, the Ni plated layer is formed on the metal shell, and a gasket of the type A2, which is made of Fe, is assembled into the metal shell. In a sample 24, the Zn plated layer is formed on the metal shell, and a gasket of the type A1, which is made of stainless steel, is assembled into the metal shell. In a sample 21, the Ni plated layer is formed on the metal shell, and a gasket of the type A1, which is made of stainless steel, is assembled into the metal shell.

Subsequently, each of the samples 21 to 25 is attached to an aluminum bush with a fastening torque of 10 N·m, and a test is conducted in which each of the samples 21 to 25 is heated at 200° C. while being vibrated under vibration conditions complying with ISO11565 for 16 hours. After testing, each of the samples is removed from the aluminum bush, and each return torque applied during removal is measured. The measurement results are shown in Table 5.

TABLE 5

| Samples | Nominal diameter | Types of plating of metal shell | Cross-sectional shapes of gasket | Materials of gasket | Return torques [N·m] |
|---|---|---|---|---|---|
| 21 | M10 | Zn | A1 | Fe | 2.9 |
| 22 | | Ni | A1 | Fe | 1.7 |
| 23 | | Ni | A2 | Fe | 0.9 |
| 24 | | Zn | A1 | Stainless steel | 7.7 |
| 25 | | Ni | A1 | stainless steel | 6.7 |

As shown in Table 5, the return torques of the samples 21 to 25 are 2.9, 1.7, 0.9, 7.7, and 6.7 [N·m] in order. From comparison of the sample 21 with the sample 22, when the plated layer on the surface of the metal shell is changed from Zn to Ni, the return torque is reduced. In the frictional force on the engagement of the screw, the Ni plated layer is larger than the Zn plated layer. When the fastening is conducted with the same fastening torque, in the axial force generated by fastening, the metal shell on which the Ni plated layer is formed becomes smaller than the metal shell on which the Zn plated layer is formed. For that reason, the return torque is reduced with a change in the plated layer on the surface of the metal shell.

From comparison of the sample 22 with the sample 23, if the gasket of the type A1(D1<D2) is used, even if the axial force generated during fastening is reduced, a sufficiently larger return torque can be ensured than that when the gasket of the type A2(D1≥D2) is used, as described in the example 1. From comparison of the sample 21 with the sample 24, it has been found that when the material of the gasket is changed from Fe to stainless steel, the loose of screwing caused by deformation (creep deformation) of the gasket is difficult to occur, and the return torque becomes large. In comparison of the sample 24 with the sample 25, it has been found that when the plated layer on the surface of the metal shell is changed from Zn to Ni regardless of the material of the gasket, the return torque is deteriorated as with the comparison result of the sample 21 with the sample 22. However, from comparison of the sample 21 with the sample 25, it could be confirmed that even if the axial force generated during assembling is reduced by forming the Ni plated layer on the surface of the metal shell, if the gasket that is made of stainless steel and satisfies D1<D2 is assembled into the metal shell, the loose of screwing caused by deformation of the gasket can be prevented. In addition, it could be confirmed that the frictional force between the gasket and the opening periphery of the mounting hole can be intensified, and the sufficient return toque can be obtained to improve the loose resistance.

Example 5

Further, even in a spark plug in which the nominal diameter of the thread of the mounting part is M12, as in the example 4, there are prepared samples 26 to 30 (refer to Table 6) in which the Zn plated layer or the Ni plated layer is formed on the surface of the metal shell, and the gasket made of Fe or stainless steel is assembled, and the hot vibration loose test has been conducted. The test method is the same as that in the example 4, and different therefrom only in that when each of the samples 26 to 30 is attached to the aluminum bush, the fastening torque of 15 N·m is used for attachment. After testing, each of the samples is removed from the aluminum bush, and each return torque applied during removal is measured. The measurement results are shown in Table 6.

TABLE 6

| Samples | Nominal diameter | Types of plating of metal shell | Cross-sectional shapes of gasket | Materials of gasket | Return torques [N·m] |
|---|---|---|---|---|---|
| 26 | M12 | Zn | A1 | Fe | 3.5 |
| 27 | | Ni | A1 | Fe | 2.1 |
| 28 | | Ni | A2 | Fe | 1.0 |
| 29 | | Zn | A1 | Stainless steel | 8.4 |
| 30 | | Ni | A1 | stainless steel | 7.2 |

As shown in Table 6, the return torques of the samples 26 to 30 are 3.5, 2.1, 1.0, 8.4, and 7.2 [N·m] in turn. As a result of comparing the samples with each other, the same effects as those in the example 4 are obtained. Accordingly, it could be confirmed that, even if the Ni plated layer is formed on the surface of the metal shell, if the gasket made of stainless steel and satisfying D1<D2 is assembled into the metal shell, a sufficient return torque can be obtained even in the spark plug of M12 to improve the loose resistance.

Example 6

Further, even in a spark plug in which the nominal diameter of the thread of the mounting part is M14, as in the examples 4 and 5, there are prepared samples 31 to 35 (refer to Table 7)

in which the Zn plated layer or the Ni plated layer is formed on the surface of the metal shell, and the gasket made of Fe or stainless steel is assembled, and the hot vibration loose test has been conducted. The test method is the same as that in the example 4, and different therefrom only in that when each of the samples 26 to 30 is attached to the aluminum bush, the fastening torque of 20 N·m is used for attachment. After testing, each of the samples is removed from the aluminum bush, and each return torque applied during removal is measured. The measurement results are shown in Table 7.

TABLE 7

| Samples | Nominal diameter | Types of plating of metal shell | Cross-sectional shapes of gasket | Materials of gasket, | Return torques [N · m] |
|---|---|---|---|---|---|
| 31 | M14 | Zn | A1 | Fe | 7.4 |
| 32 | | Ni | A1 | Fe | 3.9 |
| 33 | | Ni | A2 | Fe | 1.9 |
| 34 | | Zn | A1 | Stainless steel | 14.2 |
| 35 | | Ni | A1 | stainless steel | 11.1 |

As shown in Table 7, the return torques of the samples 31 to 35 are 7.4, 3.9, 1.9, 14.2, and 11.1 [N·m] in turn. As a result of comparing the samples with each other, the same effects as those in the examples 4 and 5 are obtained. Accordingly, it could be confirmed that, even if the Ni plated layer is formed on the surface of the metal shell, if the gasket made of stainless steel and satisfying D1<D2 is assembled into the metal shell, a sufficient return torque can be obtained even in the spark plug of M14 to improve the loose resistance.

Figure 9:
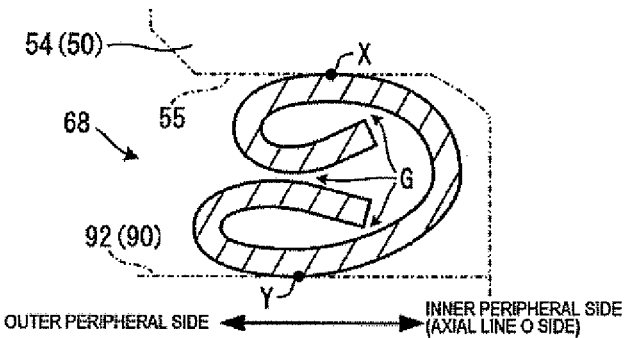
FIG. 9 is a diagram illustrating a cross section orthogonal to a circumferential direction of a gasket 68 as one modified example.
Figure 10:
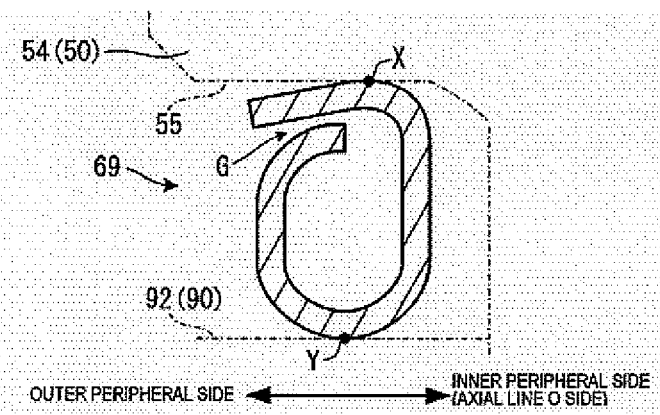
FIG. 10 is a diagram illustrating a cross section orthogonal to a circumferential direction of a gasket 69 as another modified example.

It is needless to say that various modifications can be made on the spark plug 1 according to the first embodiment. In the cross-sectional shape of the gasket 60, the first embodiment exemplifies that the shape of the cross section orthogonal to the circumferential direction is S-shaped. However, the cross-sectional shape is not limited to the S-shape. For example, as with gaskets 68 and 69 illustrated in FIGS. 9 and 10, the gasket may be formed by folding back an annular plate in the thickness direction by plural times, and satisfy the above-mentioned prescriptions 1 and 2 in an uncompressed state in the shape of a cross section orthogonal to the circumferential direction. That is, each of the gaskets 68 and 69 may satisfy that the surfaces thereof comes out of contact with each other in the uncompressed state (with gap G) (prescription 1). Further, the gaskets 68 and 69 may satisfy that each of the gaskets 68 and 69 contacts with the seating surface 55 of the protrusion part 54 and the opening periphery 92 at the respective ones of the points X and Y, and the point Y is located on the outer peripheral side of the point X in the radial direction (prescription 2). FIGS. 9 and 10 illustrate cross sections of the gaskets 68 and 69 orthogonal to the circumferential direction, respectively, where in each of the gaskets 68 and 69, the right hand side is the inner peripheral side (axial line O side), and the left hand side is the outer peripheral side. It is assumed that, in the cross sections of FIGS. 9 and 10, each of the gaskets 68 and 69 is attached to the metal shell 50 while an upper side thereof faces the protrusion part 54 side.

The first embodiment exemplifies that the cross-sectional shape of the gasket 60 is S-shaped. However, the cross-sectional shape is not limited to the S-shape. For example, the gasket 60 may have the cross-sectional shape illustrated by the type B1 or C1 in Table 1 (FIG. 16), or other cross-sectional shapes. In the gasket, D1<D2 may be satisfied by the equivalent friction diameters D1 and D2 obtained on the basis of the contact trace J of the gasket 60 with the protrusion part 54, and the contact trace K of the gasket 60 with the opening periphery 92, which are observed when removing the spark plug 1 from the engine head 90.

In order that the equivalent friction diameters D1 and D2 satisfy D1<D2, there may be used the gasket having the cross-sectional shape in which, for example, in the assembling direction (axial direction) to the metal shell, a point located on an edge of the protrusion part side in the cross section orthogonal to the circumferential direction of the gasket is arranged on the inner peripheral side of a point located on an edge of the opening periphery side. For example, in a state immediately before the gasket starts to be compressed by screwing in fitting the spark plug into the mounting hole, a cross section orthogonal to the circumferential direction of the gasket interposed between the protrusion part and the opening periphery is viewed. There may be used the gasket having the cross-sectional shape in which, in the cross section, the gasket contacts with each of the protrusion part and the opening periphery at one point, and the point contacting with the protrusion part is located on the inner peripheral side of the point contacting with the opening periphery. More specifically, as with the gasket 60 illustrated in FIG. 2, the gasket 60 may be fabricated so that the points X and Y are formed as points located on edges on both sides of the cross section orthogonal to the circumferential direction in the assembling direction, and also the point X is located on the inner peripheral side of the point Y.

The point X on the cross section of the gasket 60 is only a point at which the gasket 60 interposed between the protrusion part 54 and the opening periphery 92 contacts with the protrusion part 54, in the state immediately before the gasket 60 starts to be compressed by screwing in fitting the spark plug 1 into the mounting hole 91. That is, the gasket 60 comes into linear contact with the protrusion part 54 by the virtual circle 65 drawn by the point X over the entire circumference of the gasket 60 at the time of starting compression. Likewise, the point Y on the cross section of the gasket 60 is only a point at which the gasket 60 contacts with the opening periphery 92 in the state immediately before the gasket 60 starts to be compressed by screwing. That is, the gasket 60 comes into linear contact with the opening periphery 92 by the virtual circle 66 drawn by the point Y over the entire circumference of the gasket 60 at the time of starting compression. The gasket 60 is formed in such a manner that the points X and Y are formed in the cross section of the gasket 60, and also the diameter L1 of the virtual circle 65 drawn by the point X is smaller than the diameter L2 of the virtual circle 66 drawn by the point Y. With the above arrangement, the gasket 60 contacts with the protrusion part 54 mainly at the position of the point X, and the equivalent friction diameter D1 of the contact trace J can be brought closer to L 1. Likewise, the gasket 60 contacts with the opening periphery 92 mainly at the position of the point Y, and the equivalent friction diameter D2 of the contact trace K can be brought closer to L2. Accordingly D1<D2 is liable to be satisfied if L1<L2 is satisfied.

Subsequently, a spark plug 2 (refer to FIG. 13) according to a second embodiment will be described. In the spark plug 2 according to the second embodiment, a gasket 100 is different in shape from the gasket 60 of the first embodiment. The other configuration of the spark plug 2 is identical with that of the spark plug 1 (refer to FIG. 1) in the first embodiment. Hence, hereinafter, the gasket 100 will be described, the configuration of the spark plug 2 will be appropriately referred to the spark plug 1, and its description will be omitted. The metal shell 50 of the spark plug 2 according to the second embodiment is fabricated in conformity to the standards where the nominal diameter of the thread of the mounting portion 52 is M12. The nominal diameter is not limited to M12, but may be M10, M14, or M8.

Figure 12:
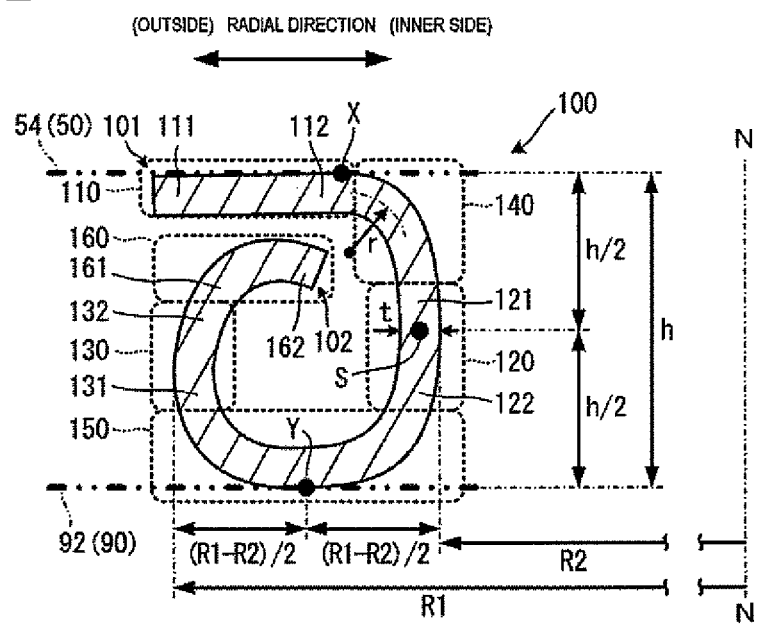
FIG. 12 is a diagram illustrating a circumferential cross section in a state where the gasket 100 has been mounted on the spark plug 2.
Figure 13:
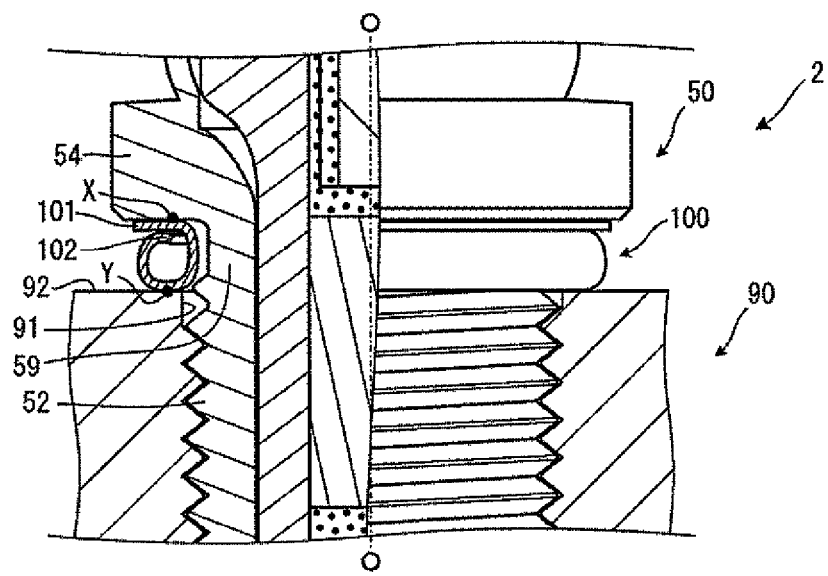
FIG. 13 is a partial cross-sectional view illustrating a state in which the spark plug 2 is attached to the engine head 90, and the gasket 100 is interposed and compressed between the protrusion part 54 of the metal shell 50 and the opening periphery 92 of the mounting hole 91.

The gasket 100 illustrated in FIG. 13 is annularly fabricated by subjecting a single annular plate made of austenitic stainless steel or ferrite stainless steel to a work for folding back in a thickness direction thereof, as with the gasket 60 (refer to FIG. 2) of the first embodiment. When the gasket 100 is mounted on the metal shell 50, a center axis N (refer to FIG. 12) of the annular gasket 100 is aligned with the direction of the axial line 0, and the gasket 100 is fitted to the screw head 59. In this situation, the gasket 100 is mounted on the screw head 59 in such a manner that a first extension part 110 side, which will be described later, faces the protrusion part 54 of the metal shell 50, and the screw head 59 is located inside of a second extension part 120, which will be described later. The gasket 100 illustrated in FIG. 13 is so deformed as to be compressed in the direction of the center axis N and swollen in the radial direction when the gasket 100 is mounted on the metal shell 50. The gasket 100 is prevented from coming free from the screw head 59. Hereinafter, a description will be given of the gasket 100 that has not yet been amounted on the metal shell 50 (that is, gasket uncompressed in the direction of the center axis N).

Figure 11:
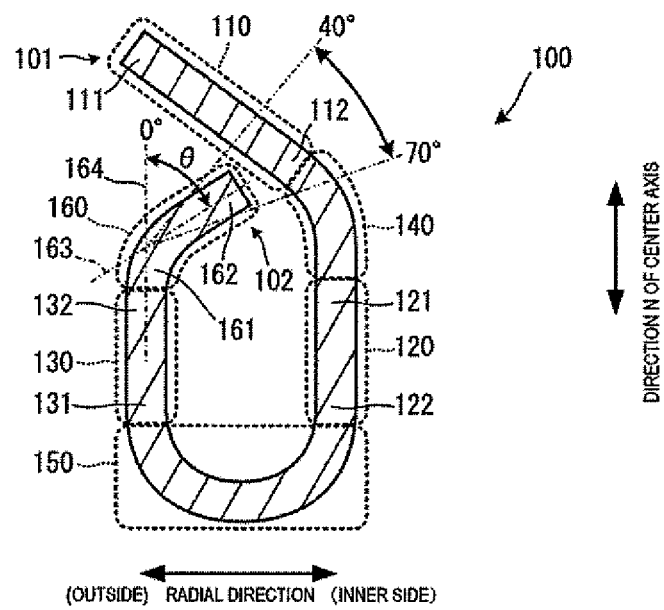
FIG. 11 is a diagram illustrating a circumferential cross section in a state where a gasket 100 has not yet been mounted on a spark plug 2.

As illustrated in FIG. 11, the gasket 100 according to the second embodiment is fabricated so that the shape of the cross section orthogonal to the circumferential direction (in other words, cross section viewing the gasket 100 on a plane including the center axis N, hereinafter referred to as "circumferential cross section") becomes spiral by folding back the above-mentioned annular plate at three portions in the thickness direction. More specifically, the gasket 100 is spiraled in the circumferential cross section so as to be continuous from one end 101 to the other end 102 while the end 102 is located inside of the end 101. For example, in order to fabricate the gasket having four or more folding back portions, or having no spiral circumferential cross section and folded back in the thickness direction of the reversed front and back, there is a need to conduct a press-molding work having at least five processes. The gasket 100 according to the second embodiment can be fabricated by a so-called one-way bending in which one surface side of the plate is always a valley side. Specifically, the gasket 100 can be formed by press molding having four processes, and therefore is good in moldability. Hereinafter, the configuration of the gasket 100 will be described. For convenience, it is assumed that the circumferential cross section of the gasket 100 includes six regions of the first extension part 110, the second extension part 120, a third extension part 130, a first connection part 140, a second connection part 150, and a third connection part 160.

The first extension part 110 is a region having a shape including the one end 101 of the gasket 100 as one end 111 thereof, and linearly extending toward the other end 112 thereof, in the circumferential cross section. The other end 112 of the first extension part 110 is arranged inside of the one end 111 in the radial direction. The second extension part 120 is a region having a shape linearly extending from one end 121 thereof toward the other end 122 thereof so that a component in the direction of the center axis N becomes larger than a component in the radial direction in the circumferential cross section. One end 121 of the second extension part 120 is arranged closer to the first extension part 110 side than the other end 122. Likewise, the third extension part 130 is a region having a shape linearly extending from one end 131 thereof toward the other end 132 thereof so that a component in the direction of the center axis N becomes larger than a component in the radial direction, in the circumferential cross section. The other end 132 of the third extension part 130 is arranged closer to the first extension part 110 side than one end 131. The third extension part 130 is arranged outside of the second extension part 120 in the radial direction.

The first connection part 140 is a region connecting the other end 112 of the first extension part 110 to one end 121 of the second extension part 120. The first connection part 140 is one region among the above three regions which are bent during manufacturing of the gasket 100. Although will be described later, when the gasket 100 is compressed at the time of mounting the metal shell 50 on the screw head 59, the first connection part 140 connects the first extension part 110 to the second extension part 120 with being shaped along a curve having the radius of curvature r in the circumferential cross section. The first connection part 140 is bent at the time of manufacturing the gasket 100 in advance so that the first connection part 140 is shaped along the curve having the radius of curvature r when the gasket 100 is compressed in mounting.

The second connection part 150 is a region that connects the other end 122 of the second extension part 120 to one end 131 of the third extension part. As with the above first connection part 140, the second connection part 150 is one of the regions which are bent during manufacturing of the gasket 100. The second connection part 150 is shaped, by bending, along a U-shaped curve which is bent in a direction away from the first extension part 110 in the direction of the center axis N in the circumferential cross section.

The third connection part 160 is a region having one end 161 thereof connected to the other end 132 of the third extension part 130, and the other end 162 thereof as the other end 102 of the gasket 100. Likewise, the third connection part 160 is one of the regions which are bent during manufacturing of the gasket 100. The other end 162 of the third connection part 160 is bent to be located inside of one end 161 in the radial direction. In this situation, the other end 162 is located between the second extension part 120 and the third extension part 130 in the radial direction, and located between the first extension part 110 and the second connection part 150 in the direction of the center axis N. With this configuration, the other end 162 of the third connection part 160 is arranged inside of the spiral shape of the gasket 100 and at a position overlapping with the first extension part 110 and the second connection part 150 in the direction of the center axis N.

The gasket 100 is thus formed into the spiral shape in the circumferential cross section, to thereby ensure a space inside of the gasket 100. The internal space functions as a crush margin where the gasket 100 is crushed when the spark plug 2 is fitted to the engine head 90 (refer to FIG. 13). In the second embodiment, for the purpose of adjusting a direction of the ground electrode 30 (refer to FIG. 1) protruded toward the inside of the combustion chamber when the spark plug 2 is fitted to the engine head 90, it is desirable to ensure a size of the crush margin in the gasket 100. For the purpose of obtaining a sufficient axial force to ensure airtightness when the gasket 100 is compressed, it is desirable to deform the second extension part 120 and the third extension part 130 of the gasket 100 to be surely swollen in the radial direction. Under the circumstances, a bend angle θ in bending the third connection part 160 is prescribed during manufacturing of the gasket 100. More specifically, it is prescribed that a direction extending from one end 161 side of the third connection part 160, which is connected to the other end 132 of the third extension part 130, to the other end 162 side of the third connection part 160 which is the other end 102 of the gasket 100 intersects with the direction of the center axis N at an angle of 40° or large and 70° or smaller.

In a state where the third connection part 160 has not yet been bent, the direction extending from one end 161 of the third connection part 160 toward the other end 162 coincides with a direction extending from one end 131 of the third extension part 130 toward the other end 132 thereof, and linearly extends. In bending the third connection part 160, the third connection part 160 is bent so that the angle θ at which the direction extending from one end 161 of the third connection part 160 to the other end 162 thereof intersects with the direction extending from one end 131 of the third extension part 130 to the other end 132 thereof is equal to or larger than 40°, and equal to or smaller than 70°. However, after the third connection part 160 has been bent, the direction extending from one end 161 to the other end 162 is different depending on a bent position. In the second embodiment, during fabrication of the gasket 100, the third connection part 160 is bent in the vicinity of one end 161, and an extension direction is maintained in the vicinity of the other end 162. Hence, for convenience, the angle θ at which an extension direction (indicated by a virtual line 163) of the third connection part 160 in the vicinity of the other end 162 intersects with an extension direction (indicated by a virtual line 164) of the third extension part 130 is studied.

According to an example 7 that will be described later, if the angle θ at which the virtual line 163 and the virtual line 164 intersect with each other is larger than 70°, the gasket 100 cannot be molded. If the angle θ at which the virtual line 163 and the virtual line 164 intersect with each other is smaller than 40°, the second extension part 120 and third extension part 130' are not deformed to be swollen in the radial direction during compression in mounting the gasket 100 on the metal shell 50, Subsequently, the gasket 100 that has been mounted on the metal shell 50 (gasket deformed to be compressed in the direction of the center axis N, and swollen in the radial direction) will be described with reference to FIGS. 12 and 13. The gasket 100 is compressed in the direction of the center axis N as illustrated in FIG. 12 with being mounted on the metal shell 50. With the compression, the circumferential cross section of the gasket 100 is swollen in the radial direction, and the inner diameter thereof becomes smaller than the outer diameter of the thread of the metal shell 50, and therefore the gasket 100 is prevented from coming free from the screw head 59. Partial compression for further reducing the inner diameter of the gasket 100 may be conducted at several portions of the gasket 100 in the circumferential direction.

The spark plug 2 illustrated in FIG. 13 is in a state where the metal shell 50 is fitted into the mounting hole 91 of the engine head 90, and the gasket 100 is interposed between the protrusion part 54 of the metal shell 50 and the opening periphery 92 of the mounting hole 91. In the state of FIG. 13, the gasket 100 has not yet been compressed in the direction of the center axis N by fastening the metal shell 50. When fastening is further conducted from this state, although not shown, the gasket 100 is compressed between the protrusion part 54 of the metal shell 50 and the opening periphery 92 of the mounting hole 91 in the direction of the center axis N, and then deformed to be swollen in the radial direction. In this situation, the gasket 100 is bent with a spring property in a direction of distancing the second extension part 120 and the third extension part 130 from each other. As a result, the gasket 100 is deformed while maintaining axial forces (reaction exerted in the direction of the center axis N due to compression associated with fastening) on the protrusion part 54 and the opening periphery 92.

In order to ensure the airtightness caused by the gasket 100 compressed between the protrusion part 54 and the opening periphery 92, it is important to apply an appropriate compression force to the gasket 100. Under the circumstances, when it is assumed that a compressive load in compressing the gasket 100 in the direction of the center axis N is F, a pressure (additive pressure) P by which an appropriate compression force is added to the gasket 100 is calculated through $P = F/\{\pi(R1^2 - R2^2)\}$. As illustrated in FIG. 12, it is assumed that, in the circumferential cross section of the gasket 100, a radial distance of a region farthest from the center axis N in the third extension part 130 from the center axis N is R1. Likewise, it is assumed that a radial distance of a region closest to the center axis N in the second extension part 120 from the center axis N is R2.

According to an example 8 that will be described later, it has been found that the additive pressure P is desirably equal to or larger than 60 MPa and equal to or smaller than 130 MPa. If the additive pressure P is smaller than 60 MPa, the airtightness by the gasket 100 is difficult to ensure. If the additive pressure P is larger than 130 MPa, the strength is difficult to ensure, and the metal shell 50 may be broken by fastening.

In order to ensure the above range of the additive pressure P, there is a need to obtain the spring property by ensuring the hardness of the gasket 100, and obtain a sufficient axial force in compressing the gasket 100. According to an example 9 that will be described later, it has been found that when the hardness of the gasket 100 is measured at a point S on the circumferential cross section of the gasket 100 illustrated in FIG. 12, the Vickers hardness is preferably equal to or higher than 200 Hv and equal to or lower than 450 Hv. In the circumferential cross section of the gasket 100 that has been mounted on the metal shell 50 which has not yet been fitted to the engine head 90, it is assumed that a height of the gasket 100 in the direction of the center axis N is h. It is assumed that a thickness of the second extension part 120 is t in a region where the height in the direction of the center axis N is h/2. It is assumed that a center position of the thickness t is the above point S.

If the Vickers hardness of the gasket 100 at the point S is lower than 200 Hv, the gasket 100 cannot obtain a sufficient spring property, and when the gasket 100 is compressed by fastening, the gasket 100 may be plastically deformed, and loosened. If the Vickers hardness of the gasket 100 at the point S is higher than 450 Hv, when the gasket 100 is compressed by fastening, the gasket 100 may be broken or cracked.

As described above, the gasket 100 according to the second embodiment has a crush margin for adjusting a direction of the ground electrode 30 protruded toward the inside of the combustion chamber when the spark plug 2 is fitted to the engine head 90. However, since there is a need to ensure the airtightness as the gasket 100, it is desirable to ensure that the additive pressure P is equal to or larger than 60 MPa and equal to or smaller than 130 MPa even if the crush margin is crushed. Hence, according to an example 10 that will be described later, in order to ensure the ignitability of the spark plug 2 in addition to ensuring the range of the additive pressure P, it is desirable that the direction of the ground electrode 30 can be adjusted by at least 90° or more. If an angle by which the direction of the ground electrode 30 can be adjusted is smaller than 90°, it may be difficult to adjust the direction of the ground electrode 30 to a direction for reducing an influence on the ignitability. If the direction of the ground electrode 30 can be adjusted by 360° (one rotation), the direction can be adjusted to all directions, and therefore an upper limit thereof is set to 360°.

Further, according to the example 10 that will be described later, it has been found that if the direction of the ground electrode 30 can be adjusted by 180° or larger, the ignitability of the spark plug 2 can be surely ensured. If the angle at which the direction of the ground electrode 30 can be adjusted is smaller than 180°, it may be difficult to adjust the direction of the ground electrode 30 to a direction for enabling an influence on the ignitability to be more reduced. The upper limit of the direction adjustment of the ground electrode 30 is set to 360° for the same reason as that described above.

In the second embodiment, in order to prevent the crushed gasket from being protruded from the protrusion part 54 while ensuring the crush margin with a sufficient size to adjust the direction of the ground electrode 30, the shape of the circumferential cross section of the gasket 100 is prescribed. As described above, it is assumed that the height of the gasket 100 in the direction of the center axis N is h, the thickness of the second extension part 120 at a position of h/2 is t, and the radius of curvature of the first connection part 140 is r. It is assumed that a radial distance of a region of the third extension part 130, which is farthest from the center axis N is R2. In this case, $2 \times t \leq r \leq (R1-R2)/2$ is satisfied, and $h \geq (R1-R2)$ is satisfied.

In the gasket 100, the second extension part 120 and the third extension part 130 are portions that are swollen in the radial direction by crush when the crush margin is crushed in the direction of the center axis N. The size of the crush margin in the direction of the center axis N is ensured by the second extension part 120 and the third extension part 130. As described above, in order to adjust the direction of the ground electrode 30, there is a need to ensure some degree of size as the size of crush in the direction of the center axis N. Hence, if h is smaller than R1−R2, and the crush margin in the radial direction is larger than that in the direction of the center axis N, the radial size when the gasket 100 is crushed is larger than that when h is equal to or larger than R1−R2. Then, the gasket 100 may be protruded from the protrusion part 54, or caught by the screw head 59. As a result, the sufficient fastening may not be conducted. According to an example 11 that will be described later, it has been found that the sufficient angle (specifically 180° or larger) could not been ensured as the angle for adjusting the direction of the ground electrode 30.

In order for the gasket 100 ensures the size crushed in the direction of the center axis N, it is preferable that the radius of curvature r of the first connection part 140 is smaller. As the radius of curvature r is larger, a size occupied by the first connection part 140 in the direction of the center axis N becomes larger. Then, the size of the second extension part 120 in the direction of the center axis N is difficult to ensure, and the sufficient crush margin could not be ensured. According to an example 11 that will be described later, it has been found that if the radius of curvature r is larger than (R1−R2)/2, the sufficient margin cannot be ensured.

On the other hand, as the radius of curvature r is smaller, the amount of strain caused by a folding process becomes larger in the first connection part 140 in manufacturing the gasket 100. Then, a bent trace of the first connection part 140 is wrinkled by a load applied to the bend, the first connection part 140 is broken or crushed with the bent trace as a starting point when the gasket 100 is compressed, and the spring property in the second extension part 120 is difficult to ensure. According to an example 12 that will be described later, it has been found that the radius of curvature r is smaller than twice the thickness t of the second extension part 120, the first connection part 140 may be broken or crushed during fabrication of the gasket 100.

The gasket 100 can be made of stainless steel (SUS) as in the first embodiment. According to an example 13 that will be described later, it has been confirmed that the loose resistance is different between a case in which the gasket 100 is made of stainless steel (SUS) and a case in which the gasket 100 is made of ion (Fe), and it becomes apparent that the gasket 100 is preferably made of stainless steel.

Further, it has been confirmed in the embodiment 13 that will be described later that a difference occurs in the loose resistance even according to the direction in which the gasket 100 is mounted on the screw head 59 of the metal shell 50. Specifically, the gasket 100 according to the second embodiment is fabricated such that, in the circumferential cross section, the second extension part 120 side is arranged inside in the radial direction, and the third extension part 130 side is arranged outside in the radial direction. The gasket 100 is mounted on the screw head 59 while the first extension part 110 side faces the protrusion part 54. On the contrary, there is a gasket (sample 143) configured such that the second extension part side is arranged outside in the radial direction, and the third extension part side is arranged inside in the radial direction, and the gasket is mounted on the screw head 59 while the first extension part side faces the protrusion part 54. There is a gasket (sample 144) configured such that the second extension part side is arranged inside in the radial direction, and the third extension part side is arranged outside in the radial direction, and the gasket is mounted on the screw head 59 while the second connection part side faces the protrusion part 54. In the gaskets of any configurations, it has been found that the axial force (return torque) necessary for removal (loose) of the screw becomes smaller than that in the gasket 100 of the second embodiment, and the loose resistance is deteriorated.

This phenomenon will be described by comparison of the equivalent friction diameters. As illustrated in FIG. 13, when the gasket 100 is mounted on the screw head 59 of the metal shell 50, the gasket 100 is compressed in the direction of the center axis N, as described above. When the metal shell 50 on which the gasket 100 is mounted is fitted into the mounting hole 91, and screwed thereinto, the gasket 100 contacts with the protrusion part 54 at one point X in an initial stage of compression. When studying a known equivalent friction diameter as an index for evaluating a substantial frictional force generated between the gasket 100 and the protrusion part 54, a diameter of a virtual circle with a radial distance of the point X as a radius corresponds to the equivalent friction diameter between the gasket 100 and the protrusion part 54. Likewise, the gasket 100 also contacts with the opening periphery 92 of the mounting hole 91 at one point Y. For that reason, the equivalent friction diameter between the gasket 100 and the opening periphery 92 corresponds to a diameter of a virtual circle with a radial distance of the point Y as a radius.

In this example, the equivalent friction diameter means "a diameter of a circle when an annular contact is replaced with a circular contact having the same rotation friction force as that of the annular contact with respect to the rotation friction force". In order to enhance the loose resistance, the frictional force between the gasket and each of the metal shell and the engine head is intensified to increase the return torque. The present inventors have observed, with the use of an aluminum bush imitating the engine head, a status of slippage occurring between the gasket and each of the metal shell and an aluminum bush when the metal shell is screwed into the mounting hole formed in the aluminum bush. As a result, it has been found that, during fastening, the slippage is liable to occur between the gasket and the metal shell, and the slippage is difficult to occur between the gasket and the aluminum bush. On the other hand, it has been found that, during loosening, the slippage is difficult to occur between the gasket and the metal shell, and the slippage is liable to occur between the gasket and the aluminum bush. From this fact, if the frictional force between the gasket and the aluminum bush, that is, the engine head is intensified more than the frictional force between the gasket and the metal shell, a resistance to the screwing loose (loose resistance) can be enhanced.

According to the example 13, the gasket of a sample 143 is identical in the equivalent friction diameter between the gasket and the opening periphery with, but larger in the equivalent friction diameter between the gasket and the protrusion part than the gasket 100 (sample 141) of the second embodiment. That is, the metal shell on which the gasket of the sample 143 is mounted cannot obtain a fastening force equivalent to that of the metal shell 50 on which the gasket 100 of the second embodiment is mounted without being fastened with a larger torque, during fastening. In other words, when the metal shell on which the gasket of the sample 143 is mounted, and the metal shell 50 on which the gasket 100 of the second embodiment is mounted are fastened with the same torque, the return torque of the metal shell 50 on which the gasket 100 of the second embodiment is mounted is larger.

The gasket of the sample 144 is smaller in the equivalent friction diameter between the gasket and the opening periphery, and larger in the equivalent friction diameter between the gasket and the protrusion part than the gasket 100 (sample 141) of the second embodiment. Hence, when both of those gaskets are fastened with the same torque, both of the fastening force and the return torque in the metal shell 50 on which the gasket 100 of the second embodiment is mounted is larger than that of the metal shell on which the gasket of the sample 144 is mounted.

Example 7

The effects obtained by prescribing the bend angle θ when the third connection part 160 is bent have been confirmed during fabrication of the gasket 100. First, whether molding using a press molding machine due to a difference in the size of the angle θ is enabled, or not, has been confirmed through simulation. In the circumferential cross section of the gasket 100 illustrated in FIG. 11, the gasket in which the bend angle θ of the third connection part 160 is 0° to 70° can be molded as a result of simulating a molding process using the press molding machine, and therefore the sample is evaluated as good. However, it is found that the gasket in which the angle θ is 90° cannot be processed in the press molding machine as a result of simulating the molding process, and the sample is evaluated as bad, Subsequently, a difference of behavior when the molded gasket is compressed due to a difference in the size of the angle θ has been confirmed through simulation. The simulation is conducted by a known FEM analysis. In the case of the gasket in which the angle θ is 40° or larger, when the gasket is compressed in the direction of the center axis N, the first extension part 110 is pressed, the first connection part 140 is bent, and one end 111 side of the first extension part 110 is moved downward. Then, the first extension part 110 contacts with the other end 162 of the third connection part 160, and the other end 162 is pressed by the first extension part 110 as it is, and moved downward so as to get into the inside of the crush margin. When the compression is further continued, the second extension part 120 is pressed through the first connection part 140 by the first extension part 110 that is subject to a drag from the other end 162 of the third connection part 160. The second extension part 120 is bent inward in the radial direction, and a length of the second extension part 120 in the direction of the center axis N is shortened. Likewise, the third connection part 160 that is subject to the drag from the first extension part 110 at the other end 162 presses the third extension part 130, the third extension part 130 is bent outward in the radial direction, and a length of the third extension part 130 in the direction of the center axis N is shortened. As a result, the crush margin is compressed in the direction of the center axis N while being swollen in the radial direction, and crushed in a desired configuration. Therefore, the sample is evaluated as good.

On the other hand, In the case of the gasket in which the angle θ is smaller than 40°, as in the above description, the first connection part 140 is bent by the compression in the direction of the center axis N, and the first extension part 110 is abutted against the other end 162 of the third connection part 160. Then, the other end 162 of the third connection part 160 is pressed by the first extension part 110, and third connection part 160 is pressed while being abutted against a surface of the first extension part 110 in the vertical direction. As a result, the third connection part 160 is bent outward in the radial direction together with the third extension part 130, and the crush margin is deformed into a parallelogram. The crush margin is crushed in the direction of the center axis N without generation of a bend that the second extension part 120 and the third extension part 130 are swollen in the radial direction. For that reason, although the crush margin is crushed, the spring property of the second extension part 120 and the third extension part 130 cannot be obtained, and the axial force cannot be ensured. Therefore, this sample is evaluated as bad. The results of the above evaluation test are shown in Table 8.

TABLE 8

| Angles | 0 | 30 | 40 | 50 | 60 | 70 | 90 |
|---|---|---|---|---|---|---|---|
| Molding properties (availability of molding) | Good | Good | Good | Good | Good | Good | Bad |
| Deformation in compression (FEM analysis results) | Bad | Bad | Good | Good | Good | Good | Good |

It has been clearly found from Table 8 that if the bend angle θ in folding the third connection part 160 is prescribed to be equal to or larger than 40° and equal to or smaller than 70° during fabrication of the gasket 100, there is obtained the gasket 100 having the crush margin of a desired configuration in view of both of the moldability and the deformation in compression.

Example 8

Subsequently, for the purpose of confirming the additive pressure necessary for the gasket 100 to ensure the airtightness and the loose resistance, an evaluation test has been conducted. An annular plate that is made of stainless steel and 0.5 mm in the thickness is subjected to a press molding process to fabricate five samples of the gasket 100. In this case, as illustrated in FIG. 12, as a result of confirming the respective dimensions of the gasket 100 in the circumferential cross section, the radius of curvature r of the first connection part 140 is 1 mm, the radial distance R1 is 8.15 mm, and the radial distance R2 is 6 mm. Five samples of the spark plug 2 in which the samples of the gasket 100 are mounted on the screw head 59 of the metal shell 50 are fitted to the aluminum bush (not shown) with respective different fastening torques (compression load F). Specifically, the additive pressures P in fitting the respective samples of the spark plug 2 (calculated by $P=F/\{(R1^2-R2^2)\}$ are set to 30, 60, 100, 130, and 190 [MPa]. In this situation, in the sample of the spark plug 2 fitted with the additive pressure P of 190 MPa, the metal shell 50 is broken. Hence, this sample is evaluated as bad in view of the strength, and the evaluation test has not been conducted in view of the following loose resistance and airtightness.

The vibration test shown in ISO11565 has been implemented on the aluminum bushes to which the samples of the spark plug 2 are fitted. Specifically, in a state where the aluminum bushes to which the samples of the spark plug 2 are fitted are heated at 200° C., the vibration of acceleration 30G±2G, frequency 50 to 500 Hz, and sweep rate 1-octave/min is given in each of the axial direction of the samples of the spark plug 2, and the orthogonal direction thereto for 8 hours. Then, after the vibration test has been conducted, each of the aluminum bushes to which the samples of the spark plug 2 have been fitted is covered with a case filled with solution (for example, ethanol). An air pressure of 1.5 MPa is applied from an opening corresponding to the combustion chamber side to the interior of the mounding hole of the aluminum bush, and the amount of air leakage per one minute is measured. The sample having the amount of air leakage equal to or smaller than 5 cc is evaluated as good because the sample can sufficiently maintain the airtightness by the gasket 100, and the sample having the amount of air leakage larger than 5 cc is evaluated as bad because the sample cannot maintain the airtightness.

Further, the spark plug 2 is removed from the aluminum bush, and in this situation, and a torque (return torque) necessary for removal of the metal shell 50 is measured, and a rate (return torque/fastening torque) of the return torque to the fastening torque is obtained on percentage. If the return torque is equal to or larger than 10% of the fastening torque, the sample is evaluated as good because the resistance to the loose (loose resistance) is good. If the return torque is smaller than 10%, the sample is evaluated as bad because the resistance to the loose is low. The results of the evaluation test are shown in Table 9.

TABLE 9

| P[MPa] | 30 | 60 | 100 | 130 | 190 |
|---|---|---|---|---|---|
| Loose resistance | Good | Good | Good | Good | — |
| Airtightness | Bad | Good | Good | Good | — |
| Strength (fracture resistance) | Good | Good | Good | Good | Bad |

As shown in FIG. 9, all of the samples of the gasket 100 that is fitted with the additive pressure P of 30 to 130 [MPa] are good in the resistance to loose. In the airtightness, the samples of the gasket 100 that is fitted with the additive pressure P of 30 to 130 [MPa] are good in the resistance to loose. The samples of the gasket 100 that is fitted with the additive pressure P of 60 to 130 [MPa] can maintain the sufficient airtightness. On the other hand, the samples of the gasket 100 that is fitted with the additive pressure P of 30[MPa] cannot maintain the airtightness. Hence, if the additive pressure P in fitting the spark plug 2 is in a range between 60 and 130 [MPa], the second extension part 120 and the third extension part 130 are deformed while maintaining the spring property to crush the crush margin. Hence, it has been found that the samples obtain the sufficient axial force as the gasket 100, and can ensure the loose resistance and the airtightness.

Example 9

Subsequently, when the crush margin is crushed, for the purpose of confirming the hardness necessary for the second extension part 120 and the third extension part 130 to be deformed while maintaining the spring property, the evaluation test has been conducted. Nine types of plates different in the Vickers hardness and 0.5 mm in thickness are prepared by variously changing annealing conditions in a process of manufacturing stainless steel. Then, the samples of the gasket 100 having the same dimensional conditions as those in the example 8 are prepared with the use of the nine types of plates. The same samples as the nine samples of the gasket 100 are prepared, separately, and the measured Vickers hardness of the respective samples at the point S is 150, 180, 200, 250, 325, 380, 400, 450, and 460 [Hv]. The Vickers hardness is measured in the test method complying with JIS Z2244 under the conditions where a test load is 1.961 N, and a load retention time is 10 seconds. Then, nine samples of the spark plug 2 on which the made samples of the gasket 100 are mounted are fitted to the aluminum bushes (not shown) with a given fastening torque, and the vibration test is implemented under the same conditions as those in the example 8. After testing, each of the spark plugs 2 is removed from the aluminum bush, and each return torque is measured. As in the example 8, the loose resistance has been evaluated. Likewise, in the evaluation of the loose resistance, if the return torque is equal to or larger than 20% of the fastening torque, the samples are evaluated as very good because the loose resistance is excellent.

The samples of the spark plug 2 on which the nine types of samples of the gasket 100 are mounted are again fitted to the respective aluminum bushes, and in this situation, the fastening torque is gradually increased. Then, if the metal shell 50 is broken (for example, thread is broken), the sample of the gasket 100 is removed to observe the exterior. If the samples of the gasket 100 are broken and cracked, those samples are evaluated as bad, and if not, the samples are evaluated as good. The results of the evaluation test are shown in Table 10.

TABLE 10

| Vickers hardness [Hv] | 150 | 180 | 200 | 250 | 325 | 380 | 400 | 450 | 460 |
|---|---|---|---|---|---|---|---|---|---|
| Broken or cracked | Good | Good | Good | Good | Good | Good | Good | Good | Bad |
| Loose resistance | Bad | Bad | Good | Very good | Very good | Very good | Very good | Very good | Very good |

As shown in Table 10, it has been found that the gaskets 100 having the Vickers hardness of 450 Hv or lower is not broken or cracked by being compressed by the enough fastening torque to break the metal shell 50, but the gaskets 100 having the Vickers hardness exceeding 450 Hv are broken or cracked. It has been found that the gaskets 100 having the Vickers hardness lower than 200 Hv are plastically deformed by heat and vibration, and the axial forces thereof are reduced. It has been found that if the Vickers hardness of the gasket 100 is set to 250 Hv or higher, the sufficient loose resistance can be ensured. Hence, it has been found that if the Vickers hardness of the gasket 100 is equal to or higher than 200 Hv and equal to or lower than 450 Hv, the second extension part 120 and the third extension part 130 can obtain the sufficient spring property, and the sufficient axial force can be obtained as the gasket 100 to ensure the loose resistance.

Example 10

Figure 14:
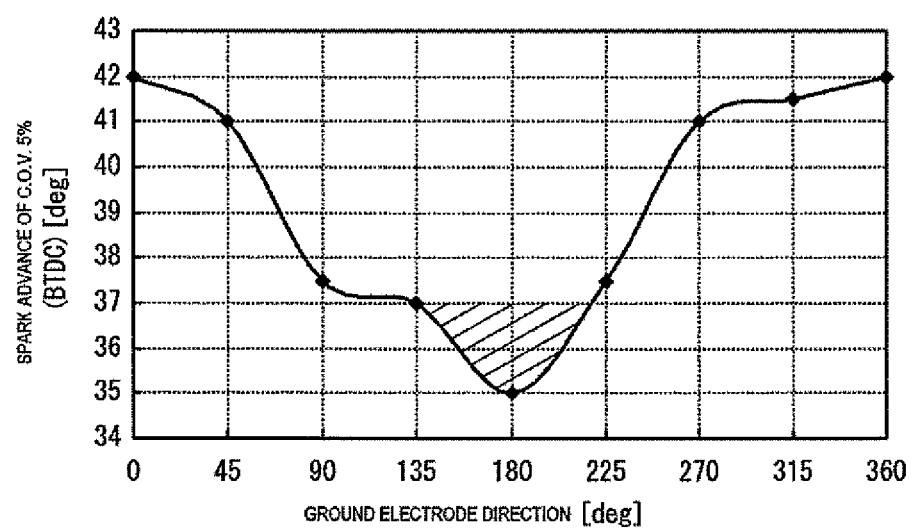
FIG. 14 is a graph illustrating a relationship between a direction of a ground electrode 30 and a before top dead center (BTDC).

Subsequently, for the purpose of studying the angle at which the direction of the ground electrode 30 can be adjusted, which is necessary to ensure the ignitability of the spark plug 2, the evaluation test has been conducted. In this example, there are prepared eight samples of the gasket 100 in which the direction of the ground electrode 30 can be adjusted in a range between 0° and 180°, with the crush margin having a size enabling the size as large as ½ of the pitch of the thread of the mounting portion 52 to be crushed. The respective samples of the gasket 100 are mounted on the respective samples of the spark plug 2, and each spark plug 2 is fitted to a test automobile engine (1.6 L, four cylinders) with the additive pressure P of 60 MPa. In this case, the direction of the ground electrode 30 within the combustion chamber (not shown) is set to 0° as a direction best in the ignitability, and the ground electrodes 30 are attached while the directions of the ground electrodes 30 in the eight samples are shifted 45° by 45°. For convenience, the respective samples are set as samples 121 to 128 in the order from 0°. When the direction of the ground electrode 30 is not adjusted, spark advance (BTDC) are 42, 41, 37.5, 37, 35, 37.5, 41, and 41.5 [°] in the order from the sample 121. The results of the evaluation test are shown in Table 11.

tion of the ground electrode 30 can be adjusted becomes larger. As shown in TABLE 11, for example, when the gasket 100 that can adjust the direction of the ground electrode 30 up to 90° is mounted, in the respective samples 121 to 128, the direction of the ground electrode 30 is adjusted in a range to +90° so that 42, 41, 37.5, 37.5, 41, 41.5, 42, and 42 [°] are obtained in order as the best values (maximum values) of the before to dead center. The minimum value among those maximum values is the maximum value 41° of the before to dead center indicated in the samples 122 and 123. Thus, it could be confirmed that if the direction of the ground electrode 30 can be adjusted up to 180°, the minimum value of the before to dead center can be improved to 41° from 35° which is indicated by the sample 125 when the direction of the ground electrode 30 cannot be adjusted. As illustrated in FIG. 14, an average value of the spark advance having values in a range between 35° and 42° is 39°. However, it has been found that if the direction of the ground electrode 30 can be adjusted by at least 180° or higher, the before to dead center can be surely

TABLE 11

| Samples | Positions of ground electrode in case of P = 60 | Spark advance (BTDC) of C.O.V. 5% | | | | | Maximum value adjustable up to +45° | Maximum value adjustable up to +90° | Maximum value adjustable up to +180° |
| --- | --- | --- | --- | --- | --- | --- | --- | --- | --- |
| | | Ground electrode adjustment angle +0° | Ground electrode adjustment angle +45° | Ground electrode adjustment angle +90° | Ground electrode adjustment angle +135° | Ground electrode adjustment angle +180° | | | |
| 121 | 0 | 42 | 41 | 37.5 | 37 | 35 | 42 | 42 | 42 |
| 122 | 45 | 41 | 37.5 | 37 | 35 | 37.5 | 41 | 41 | 41 |
| 123 | 90 | 37.5 | 37 | 35 | 37.5 | 41 | 37.5 | 37.5 | 41 |
| 124 | 135 | 37 | 35 | 37.5 | 41 | 41.5 | 37 | 37.5 | 41.5 |
| 125 | 180 | 35 | 37.5 | 41 | 41.5 | 42 | 37.5 | 41 | 42 |
| 126 | 225 | 37.5 | 41 | 41.5 | 42 | 41 | 41 | 41.5 | 42 |
| 127 | 270 | 41 | 41.5 | 42 | 41 | 37.5 | 41.5 | 42 | 42 |
| 128 | 315 | 41.5 | 42 | 41 | 37.5 | 37 | 42 | 42 | 42 |
| | | | | | | | 37 | 37.5 | 41 |
| | | | | | | | | Minimum value | |

As shown in Table 11, when there is no crush margin in the gasket 100 so that the direction of the ground electrode 30 cannot be adjusted, if the spark plug 2 is attached in the direction (180°) of the ground electrode 30 where the before to dead center is 35° as in the sample 125, the before to dead center cannot be changed from 35°, and the ignitability cannot be improved. When the crush margin of the gasket 100 is small, and the direction of the ground electrode 30 can be adjusted only up to 45°, even if the spark plug 2 is attached as in the sample 125, the direction of the ground electrode 30 is adjusted by +45° so that the before to dead center can be improved from 35° to 37.5°. On the other hand, when the spark plug 2 is attached in the direction (45°) of the ground electrode 30 where the before to dead center is 41° as in the sample 122, if the direction of the ground electrode 30 is adjusted by +45°, the before to dead center may drop to 37.5°. In this case, unless the direction of the ground electrode 30 is adjusted, 41° can be obtained as the before to dead center. Likewise, when the crush margin of the gasket 100 is slightly large, and the direction of the ground electrode 30 can be adjusted up to 90°, in the sample 125, the direction of the ground electrode 30 is adjusted by +90° so that the before to dead center can be improved from 35° to 41°. Further, when the crush margin of the gasket 100 is large, and the direction of the ground electrode 30 can be adjusted up to 180°, in the sample 125, the before to dead center can be improved from 35° to 42°.

Thus, the degree of freedom of adjusting the before to dead center can be increased more as the angle at which the direcadjusted to be higher than the average value, and the ignitability of the spark plug 2 can be surely ensured.

Example 11

Subsequently, for the purpose of confirming the effects obtained by prescribing the shape of the circumferential cross section of the gasket 100, the evaluation test has been conducted. First, a plurality of annular plates that are different in the thickness and made of stainless steel is prepared, and the bend positions and the bend angles in press molding are adjusted to prepare 16 types of samples 101 to 116 of the gasket 100. In the samples 101 to 116, each radius of curvature r of the first connection part 140 is different in a range between 0.4 mm and 1.2 mm. Each thickness t of the second extension part 120 is different in a range between 0.3 mm and 0.5 mm. Further, the combination of the radial distance R1 with the radial distance R2 in size is different, and a size (for convenience, referred to as "W") of (R1−R2)/2 deserving the size of ½ of the crush margin is different in a range between 0.8 mm and 1.075 mm. As a result of obtaining an aspect ratio C of the crush margin by h/(R1−R2), C is different in a range between 0.938 and 1.475. Table 12 shows a table comparing the thicknesses t, the radii of curvature r, the sizes W of ½ of the crush margin, and the aspect ratios C of the crush margin in the respective samples.

TABLE 12

| Samples | t | r | W = (R1-R2)/2 | C = h/(R1-R2) |
|---|---|---|---|---|
| 101 | 0.3 | 0.4 | 0.8 | 1.475 |
| 102 | 0.3 | 0.6 | 0.8 | 1.475 |
| 103 | 0.3 | 0.8 | 0.8 | 1.475 |
| 104 | 0.4 | 0.5 | 0.975 | 1.323 |
| 105 | 0.4 | 0.7 | 0.975 | 1.323 |
| 106 | 0.4 | 0.9 | 0.975 | 1.323 |
| 107 | 0.5 | 0.6 | 1.075 | 1.302 |
| 108 | 0.5 | 0.8 | 1.075 | 1.302 |
| 109 | 0.5 | 1.0 | 1.075 | 1.302 |
| 110 | 0.5 | 1.2 | 1.075 | 1.302 |
| 111 | 0.3 | 0.4 | 0.8 | 0.938 |
| 112 | 0.3 | 0.6 | 0.8 | 0.938 |
| 113 | 0.4 | 0.5 | 0.975 | 1.000 |
| 114 | 0.4 | 0.7 | 0.975 | 1.000 |
| 115 | 0.5 | 0.6 | 1.075 | 0.977 |
| 116 | 0.5 | 0.8 | 1.075 | 0.977 |

The respective samples 101 to 116 shown in Table 12 are mounted on the respective samples of the spark plugs 2, and the spark plug 2 is attached to the aluminum bush. The samples (that is, samples in which the direction of ground electrode 30 can be adjusted by 180° or higher) that enable the crush margin to be crushed up to the size of ½ pitch of the thread pitch of the mounting portion 52 have been confirmed. The adjustable samples are determined as good, and the unadjusted samples are determined as bad. The results of the evaluation test are shown in Table 13. In Table 13, attention is paid to a relationship between the size of the radius of curvature r and the aspect ratio C of the crush margin in each of the samples,

TABLE 13

| Samples | r | C | Determination |
|---|---|---|---|
| 101 | 0.50 W | 1.475 | Good |
| 111 | 0.50 W | 0.938 | Bad |
| 104 | 0.51 W | 1.323 | Good |
| 113 | 0.51 W | 1.000 | Good |
| 107 | 0.56 W | 1.302 | Good |
| 115 | 0.56 W | 0.977 | Bad |
| 105 | 0.72 W | 1.323 | Good |
| 114 | 0.72 W | 1.000 | Good |
| 108 | 0.74 W | 1.302 | Good |
| 116 | 0.74 W | 0.977 | Bad |
| 102 | 0.75 W | 1.475 | Good |
| 112 | 0.75 W | 0.938 | Bad |
| 106 | 0.92 W | 1.323 | Good |
| 109 | 0.93 W | 1.302 | Good |
| 103 | 1.00 W | 1.475 | Good |
| 110 | 1.12 W | 1.302 | Bad |

As shown in Table 13, in the samples 101 to 109, 113, and 114, the direction of the ground electrode 30 can be adjusted by 180° or higher. It has been found that in the samples 111, 112, 115, and 116 in which the aspect ratio C is lower than 1, and the crush margin is larger in the radial direction, the direction of the ground electrode 30 cannot be adjusted by 180° or higher. It has been found that in the sample 110 in which the radius of curvature r is larger than W, the direction of the ground electrode 30 cannot be adjusted by 180° or higher. Hence, it could be confirmed that if the radius of curvature r is equal to or lower than W (that is, (R1−R2)/2), and the aspect ratio C is equal to or higher than 1 (that is, if the crush margin is larger in the direction of the center axis N, and h (R1−R2) is satisfied), the direction of the ground electrode 30 can be adjusted by 180° or higher.

Example 12

Further, in the respective samples 101 to 116, the moldability in forming the first connection part 140 has been also evaluated. After the first connection part 140 is bent by the press molding used in fabricating the gaskets 100 of the samples 101 to 116, the appearance of the bent traces has been observed. In this situation, the samples where it could be confirmed that the bent trace of the first connection part 140 is wrinkled, and cracked or crushed are evaluated as bad, and the samples in which the bent trace is smoothly curved are evaluated as good. The results of the evaluation test are shown in Table 14. In Table 14, attention is paid to a relationship between the size of the radius of curvature r and the thickness t in each of the samples.

TABLE 14

| Samples | r | determination |
|---|---|---|
| 107 | 1.20 t | Bad |
| 115 | 1.20 t | Bad |
| 104 | 1.25 t | Bad |
| 113 | 1.25 t | Bad |
| 101 | 1.33 t | Bad |
| 111 | 1.33 t | Bad |
| 108 | 1.60 t | Bad |
| 116 | 1.60 t | Bad |
| 105 | 1.75 t | Bad |
| 114 | 1.75 t | Bad |
| 102 | 2.00 t | Good |
| 109 | 2.00 t | Good |
| 112 | 2.00 t | Good |
| 106 | 2.25 t | Good |
| 110 | 2.40 t | Good |
| 103 | 2.67 t | Good |

As shown in Table 14, in the samples 102, 103, 106, 109, 110, and 112 in which the radius of curvature r is twice or more as large as the thickness t, the bent trace of the first connection part 140 is not wrinkled, and smoothly curved, and the moldability is good. On the other hand, it has been confirmed that in the samples 101, 104, 105, 107, 108, 111, and 113 to 116 in which the radius of curvature r is less than twice the thickness t, the bent trace of the first connection part 140 is wrinkled. In the example 11, the spark plug 2 attached to the aluminum bush is removed, and the bent trace of the first connection part 140 in each of the samples has been observed. As a result, it has been confirmed that in the samples 101, 104, 105, 107, 108, 111, and 113 to 116 in which the radius of curvature r is less than twice the thickness t, the bent trace of the first connection part 140 is cracked or crushed.

Example 13

Subsequently, for the purpose of confirming an influence of differences in the material of the gasket 100, the direction in which the gasket 100 is mounted on the metal shell 50, and the shape of the circumferential cross section on the loose resistance, the evaluation test has been conducted. First, as in the example 8, an annular plate that is made of stainless steel and 0.5 mm in the thickness is subjected to a press molding process to fabricate the sample 141 of the gasket 100 in the second embodiment. As the respective dimensions of the gasket 100 in the circumferential cross section, the radius of curvature r of the first connection part 140 is 1 mm, the radial distance R1 is 8.15 mm, and the radial distance R2 is 6 mm. A sample 142 having the same dimensions as those of the sample 141 and made of iron (Fe) is fabricated. Further, a sample 143 whose shape in the circumferential cross section is a mirror image body of the sample 141 is fabricated. The samples of the spark plugs 2 in which the respective samples are each mounted on the screw head 59 of the metal shell 50 are fabricated. Further, a sample of the spark plug 2 in which a sample 144 obtained by reversing the sample 141 in the direction of the center axis N is mounted on the screw head 59 is prepared.

The spark plugs 2 on which the respective samples 141 to 144 are mounted are each fitted to the aluminum bush with a torque 15N·m, and the same vibration test as that in the example 8 has been conducted. Further, each spark plug 2 is removed from the aluminum bush, and in this situation, a torque (return torque) necessary for removal of the metal shell 50 is measured. The results of the evaluation test are shown in Table 15 (see FIG. 15).

As shown in Table 15 (see FIG. 15), the return torque of the sample 141 is 7.9 N·m whereas the samples 142 to 144 are 4.7, 6.7, and 4.4 [N·m], respectively, and it has been found that the loose resistance is deteriorated. In the samples 141 and 143, as a result of obtaining each of the equivalent friction diameters on the basis of the contact trace (indicated by dot X) with the protrusion part 54, the equivalent friction diameters are 13.5 mm and 14.8 mm. The equivalent friction diameters based on the contact traces (indicated by point Y) with the opening periphery 92 are identical between the samples 141 and 143. When the circumferential cross section forms the mirror image body, a ratio of the equivalent friction diameter is different between the protrusion part 54 side and the opening periphery 92 side. This fact has been confirmed by comparing the samples 141 and 143 with each other.

It is needless to say that the spark plug 2 according to the second embodiment can be variously modified. The gasket 100 is fabricated by folding the annular plate at three portions in the thickness direction. However, the gasket 100 may be fabricated by folding the annular pate at two portions, of four or more portions. The circumferential cross section of the gasket 100 may not be of the same configuration over the entire circumference of the gasket 100. That is, the gasket 100 may partially have a shape of the circumferential cross section illustrated in FIG. 12 in the circumferential direction of the gasket 100.

The shape of the circumferential cross section of the gasket 100 illustrated in FIG. 12 is in a state where the gasket 100 is compressed in the direction of the center axis N when the gasket 100 is mounted on the screw head 59 of the metal shell 50. Without being limited to this configuration, the gasket 100 may be shaped into the circumferential cross section as illustrated in FIG. 11 in the state where the gasket 100 is mounted on the screw head 59, and shaped into the circumferential cross section as illustrated in FIG. 12 by compression in fastening the spark plug 2 into the mounting hole 91.

Having described the invention, the following is claimed:

1. A spark plug, comprising:
   a center electrode;
   an insulator having an axial hole, said insulator holding the center electrode within a front end side of the axial hole;
   a cylindrical metal shell that surrounds and holds the insulator in a circumferential direction, said cylindrical metal shell having:
      a screw thread formed in an outer periphery thereof, and
      a protrusion part formed closer to a base end side than the screw thread, the protrusion part protruding outward from the outer periphery of the metal shell, and surrounding the outer periphery in a circumferential direction;
   a ground electrode that forms a spark discharge gap between the ground electrode and the center electrode; and
   a seal member having an annular configuration formed by folding an annular plate in a thickness direction a plurality of times, and concentrically mounted on a region of the metal shell between the screw thread and the protrusion part from outside, in which in a state where the metal shell is threadably fitted into an internally threaded mounting hole, the seal member is compressed between the protrusion part and an opening periphery of the mounting hole, and seals a space between the protrusion part and the opening periphery, wherein surfaces of the seal member that face each other by folding are not in contact with each other, when the seal member is in an uncompressed state prior to threadably fitting the metal shell into the mounting hole,
   wherein during a process of threadably fitting the metal shell into the mounting hole, in a state where the seal member is uncompressed while being interposed between the protrusion part of the metal shell and the opening periphery of the mounting hole,
      surfaces of the seal member which face each other by folding are not in contact with each other, and
      the seal member contacts with the protrusion part of the metal shell at only a single point of a first contact point, and the seal member contacts with the opening periphery of the mounting hole at only a single point of a second contact point, wherein the second contact point is located outside of the first contact point in a radial direction when a cross section of the seal member is viewed on a plane including an axial line of the spark plug.

2. The spark plug according to claim 1, wherein the second contact point is located inside of a maximum outer diameter Dz of a surface of the protrusion part of the metal shell, which faces the seal member.

3. A spark plug, comprising:
   a center electrode;
   an insulator having an axial hole, said insulator holding the center electrode within a front end side of the axial hole;
   a cylindrical metal shell that surrounds and holds the insulator in a circumferential direction, said cylindrical metal shell having:
      a screw thread formed in an outer periphery thereof, and
      a protrusion part formed closer to a base end side than the screw thread, the protrusion part protruding outward from the outer periphery of the metal shell, and surrounding the outer periphery in a circumferential direction;
   a ground electrode that forms a spark discharge gap between the ground electrode and the center electrode; and
   a seal member having an annular configuration concentrically mounted on a region of the metal shell between the screw thread and the protrusion part from outside, in which in a state where the metal shell is threadably fitted into an internally threaded mounting hole, the seal member is compressed between the protrusion part and an opening periphery of the mounting hole, and seals a space between the protrusion part and the opening periphery, wherein surfaces of the seal member that face each other by folding are not in contact with each other, when the seal member is in an uncompressed state prior to threadably fitting the metal shell into the mounting hole, wherein when the metal shell is threadably fitted into the mounting hole, and the seal member is interposed and compressed between the protrusion part of the metal shell and the opening periphery of the mounting hole, the seal member comes into surface contact with each of the protrusion part and the opening periphery, and the seal member contacts with the protrusion part at only a single point of a first contact point, and the seal member contacts with the opening periphery at only a single point of a second contact point, wherein the second contact point is located outside of the first contact point in a radial direction when a cross section of the seal member is viewed on a plane including an axial line of the spark plug, and wherein contact traces remaining on the protrusion part and the opening periphery with the seal member are observed when the metal shell is removed from the mounting hole, an equivalent friction diameter D1 of the contact traces is obtained through Expression (1) when $d1_o$ represents an outer diameter of the contact trace on the protrusion part side and $d1_h$ represents an inner diameter of the contact trace, and an equivalent friction diameter D2 of the contact traces is obtained through Expression (2) when $d2_o$ represents an outer diameter of the contact trace on the opening periphery side and $d2_h$ represents an inner diameter of the contact trace, D1<D2 is satisfied, where Expression (1)

$$D1 = \frac{2(d1_o^3 - d1_h^3)}{3(d1_o^2 - d1_h^2)} \quad (1)$$

Expression (2)

$$D2 = \frac{2(d2_o^3 - d2_h^3)}{3(d2_o^2 - d2_h^2)}. \quad (2)$$

4. The spark plug according to claim 3, wherein when it is assumed that a maximum outer diameter of a surface facing the seal member in the protrusion part of the metal shell is Dz, Dz>D2 is satisfied.

5. The spark plug according to claim 3, wherein the seal member is made of stainless steel, and an Ni plated layer is formed on a surface of the metal shell.

6. The spark plug according to claim 3, wherein when a cross section of the seal member is viewed along a plane including a center axis of the seal member, the cross section of the seal member has a spiral shape that is continuous from one end thereof to the other end thereof, in which the other end is located inside of the one end, in the cross section of the seal member, the seal member includes:

a first extension part that has one end thereof as the one end, and extends substantially linearly toward the other end thereof which is located inside of the seal member in the radial direction more than the one end thereof so that a component along the radial direction of the seal member becomes larger than a component along an axial direction of the seal member;

a second extension part that extends substantially linearly so that the component along the axial direction becomes larger than the component along the radial direction;

a first connection part that connects the other end of the first extension and one end of the second extension part by a curve having a radius of curvature r;

a third extension part that extends substantially linearly so that the component along the axial direction becomes larger than the component along the radial direction at a position outside of the second extension part in the radial direction;

a second connection part that connects the other end of the second extension part and one end of the third extension part by a curve bent in a direction away from the first extension part; and a third connection part that has one end thereof connected to the other end of the third extension part, and the other end thereof as the other end, and a region that is located between the first extension part and the second connection part, and overlaps with the first extension part and the second connection part, in the axial direction, the seal member is located on a side where the first extension part contacts with the protrusion part of the metal shell, and mounted on the metal shell so that the metal shell is located inside of the second extension part in the radial direction, in a state where the seal member is mounted on the metal shell before the metal shell is screwed into the mounting hole, where h represents a height of the seal member in the axial direction, and t represents a thickness of the second extension part at a position satisfying h/2, and in the radial direction of the seal member, where R1 represents a radial distance of a region of the third extension part, which is farthest from the center axis of the seal member, from the center axis, and R2 represents a radial distance of a region of the second extension part from the center axis, which is nearest to the center axis of the seal member, from the center axis, 2×t≤r≤(R1−R2)/2 is satisfied, and h≥(R1−R2) is satisfied.

7. The spark plug according to claim 6, wherein in the cross section of the seal member, the other end of the seal member is located closer to the center axis than the one end in the radial direction.

8. The spark plug according to claim 6, wherein when it is assumed that a compressive load in compressing the seal member in the axial direction is F, and an additive pressure P to the seal member is calculated through $F/\{\pi(R1^2-R2^2)\}$, a rotating angle in screwing the metal shell into the mounting hole when the additive pressure P is in a range between 60 MPa and 130 MPa, is equal to or higher than 90° and equal to or lower than 360°.

9. The spark plug according to claim 8, wherein the rotating angle in screwing the metal shell into the mounting hole when the additive pressure P is in the range between 60 MPa and 130 MPa, is equal to or higher than 180° and equal to or lower than 360°.

10. The spark plug according to claim 6, wherein when a hardness of the seal member is measured at a position of the second extension part which satisfies the h/2 and is a center of the thickness t in a cross section of the seal member mounted on the metal shell before the metal shell is screwed into the mounting hole, the Vickers hardness is equal to or higher than 200 Hv, and equal to or lower than 450 Hv.

11. The spark plug according to claim 6, wherein when a cross section of the seal member before being mounted on the metal shell is viewed, a direction extending from one end of the third connection part toward the other end side intersects with the axial direction at an angle that is equal to or higher than 40° and equal to or lower than 70°.

12. The spark plug according to claim 1, wherein the seal member is made of stainless steel, and an Ni plated layer is formed on a surface of the metal shell.

13. The spark plug according to claim 1, wherein when a cross section of the seal member is viewed along a plane including a center axis of the seal member, the cross section of the seal member has a spiral shape that is continuous from one end thereof to the other end thereof, in which the other end is located inside of the one end, in the cross section of the seal member, the seal member includes:

a first extension part that has one end thereof as the one end, and extends substantially linearly toward the other end thereof which is located inside of the seal member in the radial direction more than the one end thereof so that a component along the radial direction of the seal member becomes larger than a component along an axial direction of the seal member;

a second extension part that extends substantially linearly so that the component along the axial direction becomes larger than the component along the radial direction;

a first connection part that connects the other end of the first extension and one end of the second extension part by a curve having a radius of curvature r;

a third extension part that extends substantially linearly so that the component along the axial direction becomes larger than the component along the radial direction at a position outside of the second extension part in the radial direction;

a second connection part that connects the other end of the second extension part and one end of the third extension part by a curve bent in a direction away from the first extension part; and a third connection part that has one end thereof connected to the other end of the third extension part, and the other end thereof as the other end, and a region that is located between the first extension part and the second connection part, and overlaps with the first extension part and the second connection part, in the axial direction, the seal member is located on a side where the first extension part contacts with the protrusion part of the metal shell, and mounted on the metal shell so that the metal shell is located inside of the second extension part in the radial direction, in a state where the seal member is mounted on the metal shell before the metal shell is screwed into the mounting hole, where h represents a height of the seal member in the axial direction, and t represents a thickness of the second extension part at a position satisfying h/2, and in the radial direction of the seal member, where R1 represents a radial distance of a region of the third extension part, which is farthest from the center axis of the seal member, from the center, and R2 represents a radial distance of a region of the second extension part from the center axis, which is nearest to the center axis of the seal member, from the center axis, $2 \times t \leq r \leq (R1-R2)/2$ is satisfied, and $h \geq (R1-R2)$ is satisfied.

14. The spark plug according to claim 13, wherein in the cross section of the seal member, the other end of the seal member is located closer to the center axis than the one end in the radial direction.

15. The spark plug according to claim 14, wherein when it is assumed that a compressive load in compressing the seal member in the axial direction is F, and an additive pressure P to the seal member is calculated through $F/\{\pi(R1^2-R2^2)\}$, a rotating angle in screwing the metal shell into the mounting hole when the additive pressure P is in a range between 60 MPa and 130 MPa, is equal to or higher than 90° and equal to or lower than 360°.

16. The spark plug according to claim 15, wherein the rotating angle in screwing the metal shell into the mounting hole when the additive pressure P is in the range between 60 MPa and 130 MPa, is equal to or higher than 180° and equal to or lower than 360°.

17. The spark plug according to claim 13, wherein when a hardness of the seal member is measured at a position of the second extension part which satisfies the h/2 and is a center of the thickness t in a cross section of the seal member mounted on the metal shell before the metal shell is screwed into the mounting hole, the Vickers hardness is equal to or higher than 200 Hv, and equal to or lower than 450 Hv.

18. The spark plug according to claim 13, wherein when a cross section of the seal member before being mounted on the metal shell is viewed, a direction extending from one end of the third connection part toward the other end side intersects with the axial direction at an angle that is equal to or higher than 40° and equal to or lower than 70°.

* * * * *